US012652252B2

(12) United States Patent
Bharadwaj

(10) Patent No.: US 12,652,252 B2
(45) Date of Patent: Jun. 9, 2026

(54) INCAST CONGESTION MANAGEMENT

(71) Applicant: Cisco Technology, Inc., San Jose, CA (US)

(72) Inventor: Harsha Bharadwaj, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 18/674,667

(22) Filed: May 24, 2024

(65) Prior Publication Data

US 2025/0365235 A1    Nov. 27, 2025

(51) Int. Cl.
*H04L 47/125* (2022.01)
*H04L 47/122* (2022.01)
*H04L 47/30* (2022.01)

(52) U.S. Cl.
CPC .......... *H04L 47/125* (2013.01); *H04L 47/122* (2013.01); *H04L 47/30* (2013.01)

(58) Field of Classification Search
CPC ...... H04L 47/125; H04L 47/122; H04L 47/30
See application file for complete search history.

(56) References Cited

U.S. PATENT DOCUMENTS

| | | |
|---|---|---|
| 2020/0084150 A1 | 3/2020 | Burstein et al. |
| 2020/0280518 A1 | 9/2020 | Lee et al. |
| 2021/0119930 A1 | 4/2021 | Debbage et al. |
| 2021/0320866 A1* | 10/2021 | Le ........................... H04L 49/90 |
| 2021/0328930 A1* | 10/2021 | Nikolaidis ............ H04L 47/115 |
| 2022/0182324 A1* | 6/2022 | Raman ..................... H04L 47/12 |
| 2022/0210075 A1* | 6/2022 | Musleh .................... H04L 47/30 |
| 2023/0412518 A1* | 12/2023 | Zheng ...................... H04L 47/31 |
| 2024/0129260 A1* | 4/2024 | Farrokhbakht ......... H04L 45/22 |
| 2024/0394215 A1* | 11/2024 | Ichikawa .......... G06F 15/17356 |

OTHER PUBLICATIONS

Torsten Hoefler et al., Datacenter Ethernet and RDMA: Issues at Hyperscale, IEEE Computer, Apr. 15, 2023.
Li, Jie et al., IEEE 802 Nendica Report: Intelligent Lossless Data Center Networks, IEEE SA Industry connections.

* cited by examiner

*Primary Examiner* — Hee Soo Kim
(74) *Attorney, Agent, or Firm* — Rutan & Tucker, LLP; Ravi Mohan; Marc McClain

(57) ABSTRACT

Devices, systems, methods, and processes for incast congestion management are described herein. Typically, in a Packet Sequence Number (PSN) based Remote Direct Memory Access (RDMA) network, Priority Flow Control (PFC) is asserted upstream when an incast congestion event occurs, which can victimize unrelated flows. Thus, instead of asserting PFC, a switch in the PSN based RDMA network detects an incast congestion event and directly notifies one or more Reliable Connection (RC) Queue Pairs (QPs) of various sending devices, associated with the incast congestion event using Receiver Not Ready (RNR) negative acknowledgements (NACKs). These RNR NACKs are associated with unique pause time-periods. The associated RC QPs receive the RNR NACKs and pause packet transmission. The associated RC QPs resume packet transmission upon expiration of corresponding pause time-periods. Thus, the packet transmission from the contributing RC QPs is spaced out, avoiding all packets reaching a switch output port at the same time.

19 Claims, 10 Drawing Sheets

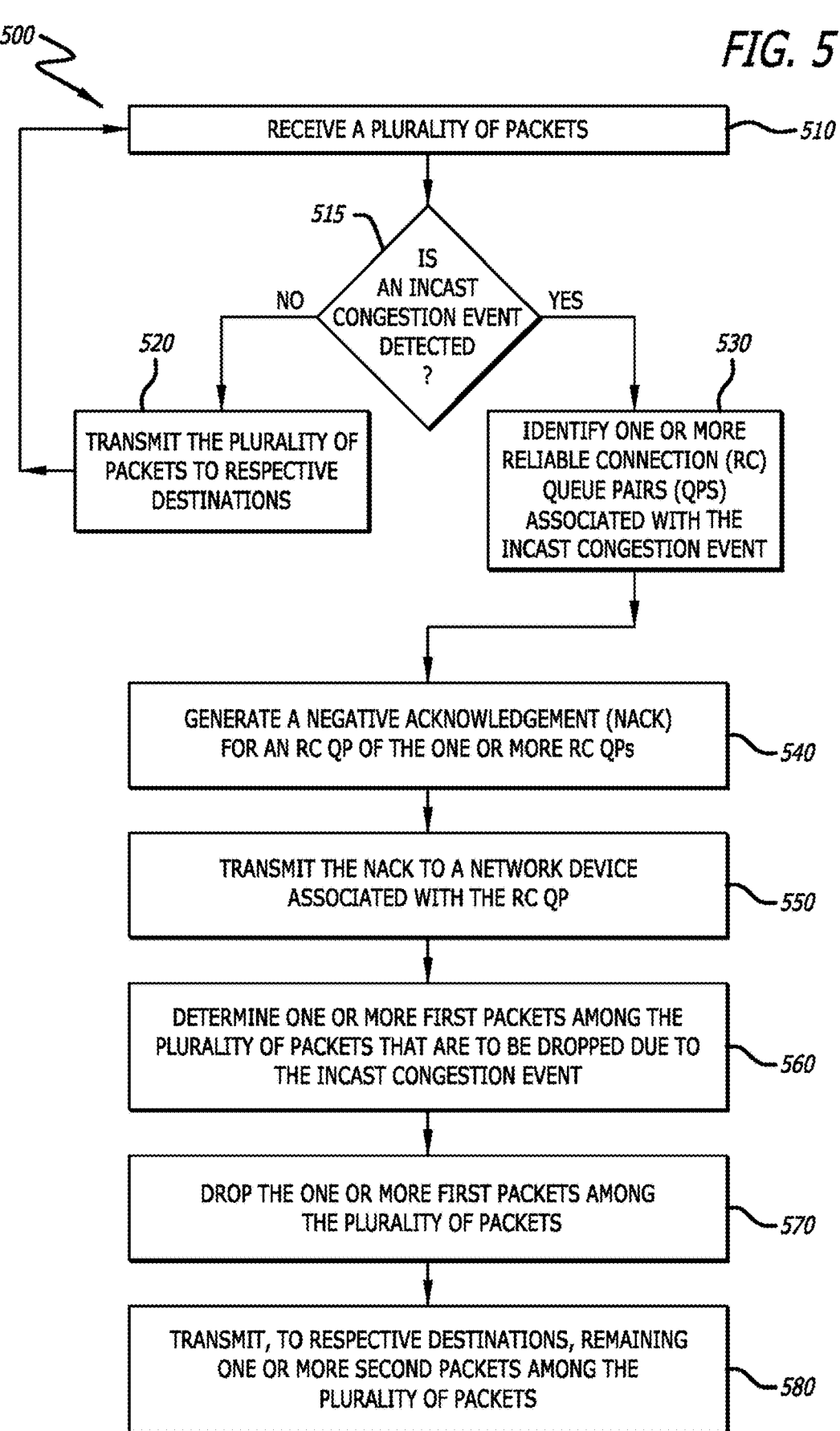

RECEIVE A PLURALITY OF PACKETS — *510*

*515*

IS AN INCAST CONGESTION EVENT DETECTED ?

NO

YES

*520*

TRANSMIT THE PLURALITY OF PACKETS TO RESPECTIVE DESTINATIONS

*530*

IDENTIFY ONE OR MORE RELIABLE CONNECTION (RC) QUEUE PAIRS (QPS) ASSOCIATED WITH THE INCAST CONGESTION EVENT

GENERATE A NEGATIVE ACKNOWLEDGEMENT (NACK) FOR AN RC QP OF THE ONE OR MORE RC QPs — *540*

TRANSMIT THE NACK TO A NETWORK DEVICE ASSOCIATED WITH THE RC QP — *550*

DETERMINE ONE OR MORE FIRST PACKETS AMONG THE PLURALITY OF PACKETS THAT ARE TO BE DROPPED DUE TO THE INCAST CONGESTION EVENT — *560*

DROP THE ONE OR MORE FIRST PACKETS AMONG THE PLURALITY OF PACKETS — *570*

TRANSMIT, TO RESPECTIVE DESTINATIONS, REMAINING ONE OR MORE SECOND PACKETS AMONG THE PLURALITY OF PACKETS — *580*

Figure 6:
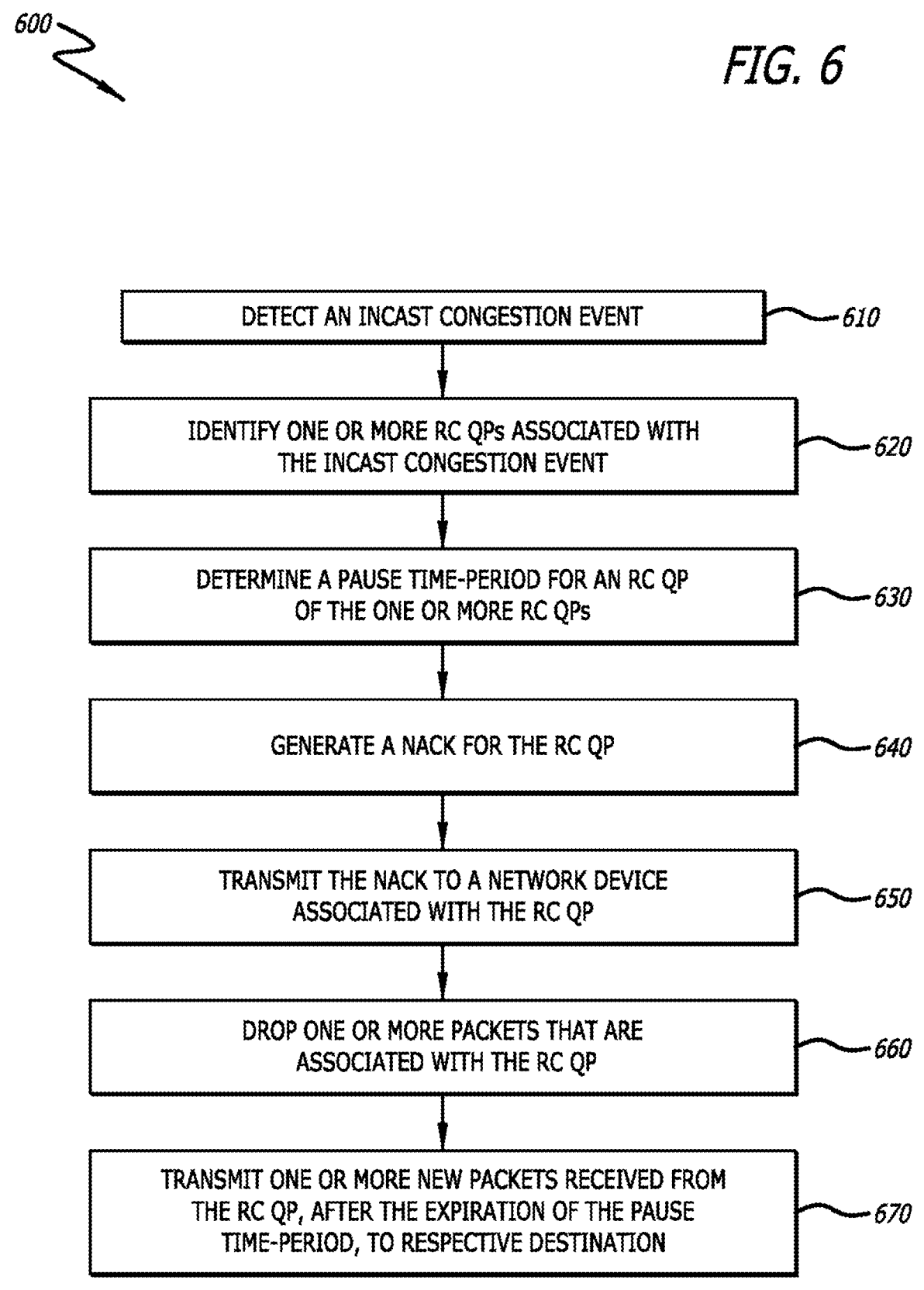

DETECT AN INCAST CONGESTION EVENT — 610

IDENTIFY ONE OR MORE RC QPs ASSOCIATED WITH THE INCAST CONGESTION EVENT — 620

DETERMINE A PAUSE TIME-PERIOD FOR AN RC QP OF THE ONE OR MORE RC QPs — 630

GENERATE A NACK FOR THE RC QP — 640

TRANSMIT THE NACK TO A NETWORK DEVICE ASSOCIATED WITH THE RC QP — 650

DROP ONE OR MORE PACKETS THAT ARE ASSOCIATED WITH THE RC QP — 660

TRANSMIT ONE OR MORE NEW PACKETS RECEIVED FROM THE RC QP, AFTER THE EXPIRATION OF THE PAUSE TIME-PERIOD, TO RESPECTIVE DESTINATION — 670

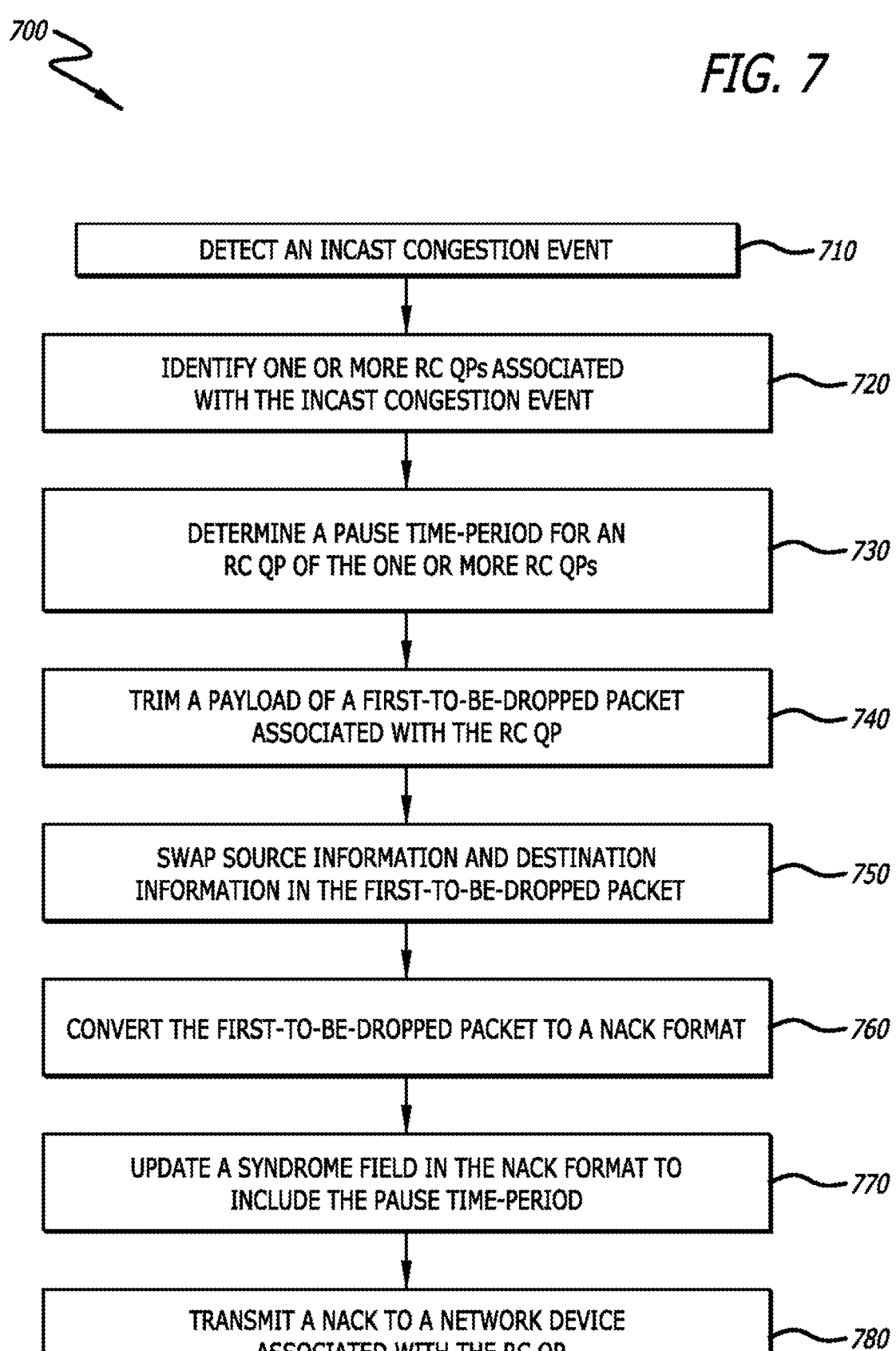

DETECT AN INCAST CONGESTION EVENT ～710

IDENTIFY ONE OR MORE RC QPs ASSOCIATED WITH THE INCAST CONGESTION EVENT ～720

DETERMINE A PAUSE TIME-PERIOD FOR AN RC QP OF THE ONE OR MORE RC QPs ～730

TRIM A PAYLOAD OF A FIRST-TO-BE-DROPPED PACKET ASSOCIATED WITH THE RC QP ～740

SWAP SOURCE INFORMATION AND DESTINATION INFORMATION IN THE FIRST-TO-BE-DROPPED PACKET ～750

CONVERT THE FIRST-TO-BE-DROPPED PACKET TO A NACK FORMAT ～760

UPDATE A SYNDROME FIELD IN THE NACK FORMAT TO INCLUDE THE PAUSE TIME-PERIOD ～770

TRANSMIT A NACK TO A NETWORK DEVICE ASSOCIATED WITH THE RC QP ～780

*800*

SNOOP ONE OR MORE INCOMING PACKETS ASSOCIATED WITH AN RC OF AN RC QP — *810*

SNOOP ONE OR MORE ACKNOWLEDGEMENTS (ACKs) AND ONE OR MORE NACKs ASSOCIATED WITH THE RC — *820*

MAINTAIN ONE OR MORE STATES FOR THE RC — *830*

GENERATE A NACK FOR THE RC QP ASSOCIATED WITH AN INCAST CONGESTION EVENT — *840*

TRANSMIT THE NACK TO A NETWORK DEVICE ASSOCIATED WITH THE RC QP — *850*

*900*

TRANSMIT ONE OR MORE PACKETS VIA A SEND
QUEUE (SQ) OF AN RC QP — *910*

RECEIVE A NACK TO PAUSE
PACKET TRANSMISSION OF THE SQ — *920*

PAUSE THE PACKET TRANSMISSION OF THE SQ — *930*

HAS
A PAUSE
TIME-PERIOD
EXPIRED
? — *935*

NO

YES

RESUME PACKET TRANSMISSION OF THE SQ — *940*

INCAST CONGESTION MANAGEMENT

The present disclosure relates to communications. More particularly, the present disclosure relates to managing incast congestion.

BACKGROUND

In the realm of high performance computing (HPC), handling large datasets and models presents a significant challenge. Offloading computations to multiple graphics processing units (GPUs) accelerates tasks, but often exceeds a single GPU's memory capacity. To address this concern, data and computations are distributed across multiple GPU nodes in clusters. Thus, requiring efficient interconnection between GPUs via a high-speed network. Remote Direct Memory Access (RDMA) over Converged Ethernet version 2 (RoCEv2) has emerged as a pivotal protocol facilitating fast communication between GPUs and running workloads in parallel.

Inter GPU data movement and reduction operations, for example, All-to-All, All-Reduce, All-Gather, or the like, can result in many-to-one (multiple sender single receiver) communication. This many-to-one communication can cause an 'incast' at a switch port. Further, these incast traffic patterns involving high bandwidth inter-GPU traffic can cause buffer overruns and congestion on the switch port, which can result in packet drops, retransmissions, longer message completion, and an overall increased job completion time. Additionally, when the GPUs run multiple iterations of compute-communicate-synchronize cycles, incast congestion can repeat in every iteration.

RoCEv2 ensures a lossless Ethernet network by enabling priority flow control (PFC) globally in network fabric. PFC pauses a sender port (for example, a leaf switch port) when buffers are not available on a receiver port (e.g., a GPU). During incast congestion, pausing the leaf switch port can further exhaust receive buffers in the leaf switch port, and a back pressure may propagate towards spine uplinks. As PFC is asserted towards network core, it can victimize unrelated flows, for example, traffic flows destined to a different leaf switch port, which is undesirable. Further, RoCEv2 does not define a method to specifically handle incast congestion.

SUMMARY OF THE DISCLOSURE

Systems and methods for managing incast congestion in accordance with embodiments of the disclosure are described herein. In many embodiments, a device includes a processor, a network interface controller configured to provide access to a network, and a memory communicatively coupled to the processor. The memory includes a congestion management logic that is configured to detect an incast congestion event, generate a negative acknowledgement for a Reliable Connection (RC) Queue Pair (QP) associated with the detected incast congestion event, and transmit the negative acknowledgement to a network device associated with the RC QP.

In a number of embodiments, the incast congestion event is detected based on an output buffer threshold of the device.

In a variety of embodiments, the incast congestion event is detected based on a count of incoming packets exceeding the output buffer threshold of the device.

In additional embodiments, the congestion management logic is further configured to determine one or more packets that are to be dropped due to the detected incast congestion event and drop the determined one or more packets.

In more embodiments, the negative acknowledgement corresponds to a receiver not ready negative acknowledgement and is configured to indicate a packet sequence number of a first-to-be-dropped packet associated with the RC QP.

In some more embodiments, the negative acknowledgement is further configured to indicate a pause time-period.

In yet more embodiments, the congestion management logic is further configured to determine the pause time-period based on a round trip time associated with the network.

In still yet more embodiments, the negative acknowledgement is configured to pause packet transmission from a Send Queue (SQ) of the RC QP.

In additional embodiments, the negative acknowledgement for the RC QP and another negative acknowledgement for another RC QP have unique pause time-periods.

In numerous embodiments, generating the negative acknowledgement for the RC QP includes trimming a payload of a first-to-be-dropped packet associated with the RC QP, swapping source information and destination information in the first-to-be-dropped packet, converting the first-to-be-dropped packet to a negative acknowledgement format, wherein the negative acknowledgement format includes a syndrome field, and updating the syndrome field in the negative acknowledgement format to include a pause time-period for the RC QP.

In numerous additional embodiments, to generate the negative acknowledgement, the congestion management logic is further configured to maintain one or more states for an RC associated with the RC QP.

In several embodiments, the one or more states include at least one of a destination QP or a current message sequence number associated with the RC.

In several more embodiments, to maintain the destination QP, the congestion management logic is further configured to snoop one or more incoming packets associated with the RC.

In certain embodiments, to maintain the current message sequence number, the congestion management logic is further configured to snoop one or more acknowledgements associated with the RC.

In further embodiments, a device includes a processor, a network interface controller configured to provide access to a network, and a memory communicatively coupled to the processor. The memory includes a Reliable Connection (RC) Queue Pair (QP) including a Send Queue (SQ) and a congestion management logic. The congestion management logic is configured to transmit one or more packets via the SQ, receive a negative acknowledgement to pause packet transmission of the SQ based on the RC QP associated with an incast congestion at a network device, and pause the packet transmission of the SQ based on the negative acknowledgement.

In many further embodiments, the negative acknowledgement is configured to indicate at least one of a pause time-period and a packet sequence number.

In still further embodiments, the packet transmission is paused for the pause time-period.

In further additional embodiments, the congestion management logic is further configured to resume the packet transmission based on expiration of the pause time-period.

In still yet further embodiments, the congestion management logic is further configured to resume the packet transmission of the SQ from a packet having the packet sequence number indicated by the negative acknowledgement.

In still yet additional embodiments, a method includes detecting an incast congestion event, generating a negative acknowledgement for a Reliable Connection (RC) Queue Pair (QP) associated with the detected incast congestion event, and transmit the negative acknowledgement to a network device associated with the RC QP.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 5 is a flowchart showing a process for incast congestion management in accordance with various embodiments of the disclosure;

FIG. 6 is a flowchart showing a process for incast congestion management in accordance with various embodiments of the disclosure;

FIG. 7 is a flowchart showing a process for incast congestion management in accordance with various embodiments of the disclosure;

Figure 1:
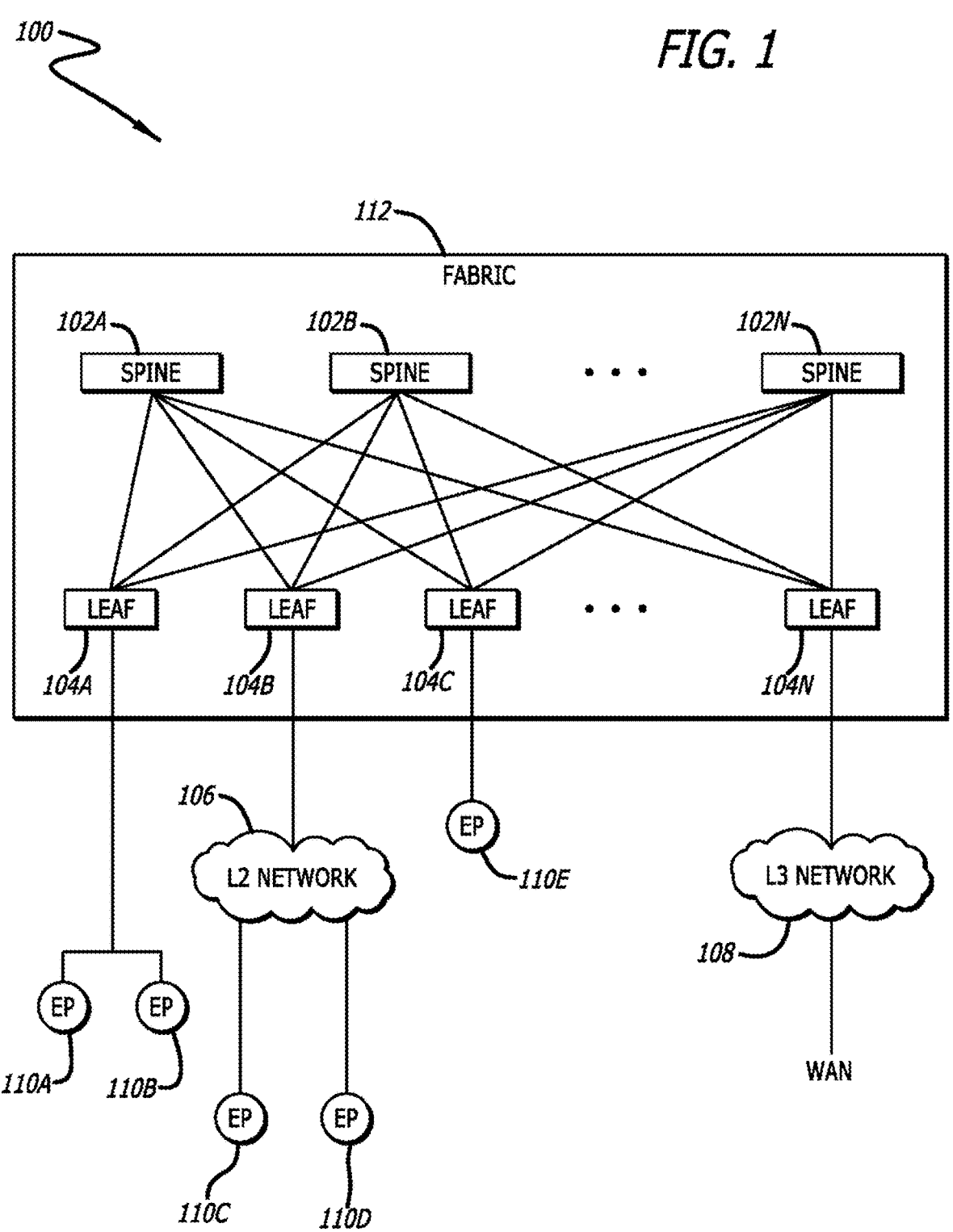
FIG. 1 is a schematic block diagram of an example architecture for a network fabric in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that leverage packet trimming and Back to Sender (BTS) capabilities of a switch to manage incast congestion in Priority Flow Control (PFC) Enabled Remote Direct Memory Access (RDMA) over Converged Ethernet version 2 (RoCEv2) networks. In the realm of Artificial Intelligence (AI)/Machine learning (ML) workloads, handling large datasets and models, for example, Large Language Models (LLMs), presents a significant challenge. Offloading computations to multiple graphics processing units (GPUs) accelerates tasks, but often exceeds a single GPU's memory capacity. To address this concern, AI/ML frameworks distribute data and computations across multiple GPU nodes in clusters. High-performance AI data centers primarily depend on GPUs, requiring efficient interconnection via a high-speed network. Remote Direct Memory Access (RDMA), originating from high performance community (HPC), is widely used in AI/ML clusters. RDMA over Converged Ethernet version 2 (RoCEv2) has emerged as a pivotal protocol facilitating fast communication between GPUs.

Inter GPU data movement and reduction operations, for example, All-to-All, All-Reduce, All-Gather, or the like, can result in many-to-one (multiple sender single receiver) communication. This many-to-one communication can cause an 'incast' at a switch port. Further, these incast traffic patterns involving high bandwidth inter-GPU traffic can cause buffer overruns and congestion on the switch port, which can result in packet drops, retransmissions, longer message completion, and an overall increased job completion time. Additionally, when the GPUs run multiple iterations of compute-communicate-synchronize cycles, incast congestion can repeat in every iteration. RoCEv2 ensures a lossless Ethernet network by enabling PFC globally in network fabric. PFC pauses a sender port (for example, a leaf switch port) when buffers are not available on a receiver port (e.g., a GPU). During incast congestion, pausing the leaf switch port can further exhaust receive buffers in the leaf switch port, and a back pressure may propagate towards spine uplinks. As PFC is asserted towards network core, it can victimize unrelated flows, for example, traffic flows destined to a different leaf switch port, which is undesirable.

There are specific congestion control schemes, for example, Data Center Quantized Congestion Notification (DCQCN), Explicit Congestion Notification (ECN), etc., defined for RoCEv2 networks. For example, in ECN based congestion control scheme, an ECN with a binary parameter (Congestion=yes/no) is utilized to manage network congestion. ECN-capable switches mark packets upon congestion detection, which receivers relay to senders for traffic rate reduction. However, sudden incasts (e.g., without gradual buildup) during operations like All-All or All-reduce pose challenges, as ECN lacks advanced detection of incast possibilities, potentially leading to delayed or ineffective congestion signaling and rate adjustment. Further, DCQCN implemented in PFC-enabled networks, leverages ECN marking for flow control, reducing sender transmission rates upon congestion onset to preempt PFC triggers, and automatically resuming normal rates after congestion subsides. However, configuring ECN and PFC thresholds poses challenges in complex environments with numerous switches, which is usually the case with AI/ML workloads. Thus, RoCEv2 does not define a method specifically designed to handle incast congestion. Hence, there is a need for a technical solution that solves the issues described above and enables incast congestion management, for example, in RoCEv2 lossless networks with PFC enabled.

In many embodiments, a switch in an RDMA network (e.g., RoCEv2 network) can detect a possible incast congestion event based on packets from multiple senders converging on the same switch output port and breaching (e.g., exceeding) an output buffer threshold of the output port. In a variety of embodiments, to reduce the impact of the detected incast congestion event, the switch may directly notify one or more Reliable Connection (RC) Queue Pairs (QPs), of various sending devices, associated with the incast congestion using Receiver Not Ready (RNR) negative acknowledgements (NACKs). These RNR NACKs are associated with staggered pause time-periods. For example, the switch can generate and transmit one RNR NACK per RC QP and each RNR NACK indicates a different pause time-period for the corresponding RC QP.

In a variety of embodiments, each RNR NACK may cause a send queue (SQ) of the corresponding RC QP to pause and retry packet transmission, after the pause time-period ends. The RC QPs can start packet transmission from a Packet Sequence Number (PSN) associated with corresponding RNR NACKs. PSN is a monotonically increasing number that is used to mark packet order. A PSN in an RNR NACK may indicate that a packet with the PSN had an error and request packet retransmission as per the indicated pause time-period.

In a number of embodiments, the switch may utilize packet trimming and BTS capabilities at the switch output port, that detected the incast congestion event, to generate the RNR NACKs. For example, for an RC QP associated with the incast congestion event, the switch may identify a first-to-be-dropped packet, trim a payload, and swap source information and destination information in the first-to-be-dropped packet. The switch may then convert a request packet format of the first-to-be-dropped packet to a NACK format. In the NACK format, the switch updates a syndrome field to include a pause time-period. The syndrome field is usually 8 bits long and the switch may add the information regarding the pause time-period in the lower 5 bits of the syndrome field. Further, the NACK format indicates a PSN of the first-to-be-dropped packet associated with the RC QP. In additional embodiments, the switch may determine the pause time-period based on a round trip time associated with the network.

In the above described incast congestion management scheme, the RC QPs associated with the incast congestion event receive the RNR NACKs from the switch and pause packet transmission for the pause time-period indicated in the received the RNR NACKs. The RC QPs can retry packet transmission after different pause time-periods indicated by the corresponding RNR NACK. Thus, the packet transmission from the RC QPs is spaced out, avoiding all packets reaching the switch output port at the same time. In other words, the above described incast congestion management scheme not only enables a switch in a PFC enabled RDMA network (e.g., RoCEv2 network) to manage and recover from an incast congestion event, it also reduces a possibility of re-occurrence of the incast congestion event at the same switch output port when the RC QPs restart packet transmission.

Aspects of the present disclosure may be embodied as an apparatus, system, method, or computer program product.

Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in various embodiments, may alternatively be embodied by or implemented as a component.

A circuit, as used herein, comprises a set of one or more electrical and/or electronic components providing one or more pathways for electrical current. In various embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in various embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of an example architecture 100 for a network fabric 112 in accordance with various embodiments of the disclosure is shown. The network fabric 112 can include spine switches 102A, 102B, . . . 102N (collectively "102") connected to leaf switches 104A, 104B, 104C, . . . 104N (collectively "104") in the network fabric 112. As those skilled in the art will recognize, networking fabric can refer to a high-speed, high-bandwidth interconnect system that enables multiple devices to communicate with each other efficiently and reliably. It is a network topology that is designed to provide a flexible and scalable infrastructure for data center, cloud environments, and other network elements.

Various embodiments described herein can include a leaf-spine architecture comprising a plurality of spine switches and leaf switches. Spine switches 102 can be L3 switches in the fabric 112. An L3 switch, or Layer 3 switch, is a networking device that operates at a network layer (Layer 3) of Open Systems Interconnection (OSI) model. However, in some cases, the spine switches 102 can also, or otherwise, perform L2 (e.g., Layer 2 of OSI model) functionalities. Further, the spine switches 102 can support various capabilities, such as, but not limited to, 40 or 10 Gbps Ethernet speeds. To this end, the spine switches 102 can be configured with one or more 40 Gigabit Ethernet ports. In various embodiments, each port can also be split to support other speeds. For example, a 40 Gigabit Ethernet port can be split into four 10 Gigabit Ethernet ports, although a variety of other combinations are available.

In many embodiments, one or more of the spine switches 102 can be configured to host a proxy function that performs a lookup of the endpoint address identifier to locator mapping in a mapping database on behalf of leaf switches 104 that do not have such mapping. The proxy function can do this by parsing through the packet to the encapsulated tenant packet to get to the destination locator address of the tenant. The spine switches 102 can then perform a lookup of their local mapping database to determine the correct locator address of the packet and forward the packet to the locator address without changing certain fields in the header of the packet.

In various embodiments, when a packet is received at a spine switch $102_i$, wherein subscript "i" indicates that this operation may occur at any spine switch 102A to 102N, the spine switch $102_i$ can first check if the destination locator address is a proxy address. If so, the spine switch $102_i$ can perform the proxy function as previously mentioned. If not, the spine switch $102_i$ can look up the locator in its forwarding table and forward the packet accordingly.

In a number of embodiments, one or more spine switches 102 can connect to one or more leaf switches 104 within the fabric 112. Leaf switches 104 can include access ports (or non-fabric ports) and fabric ports. Fabric ports can provide uplinks to the spine switches 102, while access ports can provide connectivity for devices, hosts, endpoints, VMs, or external networks to the fabric 112.

In more embodiments, leaf switches 104 can reside at the edge of the fabric 112, and can thus represent the physical network edge. In some cases, the leaf switches 104 can be top-of-rack ("ToR") switches configured according to a ToR architecture. In other cases, the leaf switches 104 can be aggregation switches in any particular topology, such as end-of-row (EoR) or middle-of-row (MoR) topologies. The leaf switches 104 can also represent aggregation switches, for example.

In additional embodiments, the leaf switches 104 can be responsible for routing and/or bridging various packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, the leaf switches 104 can contain virtual switching functionalities, such as a virtual tunnel endpoint (VTEP) function. Further, leaf switches 104 can connect the fabric 112 to an overlay network.

In further embodiments, network connectivity in the fabric 112 can flow through the leaf switches 104. Here, the leaf switches 104 can provide servers, resources, endpoints, external networks, or VMs access to the fabric 112, and can connect the leaf switches 104 to each other. In some cases, the leaf switches 104 can connect endpoint groups to the fabric 112 and/or any external networks. Each endpoint group can connect to the fabric 112 via one of the leaf switches 104, for example.

Endpoints 110 A-E (collectively "110", shown as "EP") can connect to the fabric 112 via leaf switches 104. For example, endpoints 110A and 110B can connect directly to leaf switch 104A, which can connect endpoints 110A and 110B to the fabric 112 and/or any other one of the leaf switches 104. Similarly, endpoint 110E can connect directly to leaf switch 104C, which can connect endpoint 110E to the fabric 112 and/or any other of the leaf switches 104. On the other hand, endpoints 110C and 110D can connect to leaf switch 104B via L2 network 106. Similarly, the wide area network (WAN) can connect to the leaf switches 104C or 104D via L3 network 108.

In various embodiments, endpoints 110 can include any communication devices, such as computers, servers, switches, routers, graphics processing units (GPUs), etc. In some cases, the endpoints 110 can include a server, hypervisor, or switch configured with a VTEP functionality which connects an overlay network with the fabric 112. The overlay network can host physical devices, such as servers, applications, endpoint groups, virtual segments, virtual workloads, etc. In addition, the endpoints 110 can host virtual workload(s), clusters, and applications or services, which can connect with the fabric 112 or any other device or network, including an external network. For example, one or more endpoints 110 can host, or connect to, a cluster of load balancers or an endpoint group of various applications.

Although a specific embodiment for an architecture 100 is described above with respect to FIG. 1, any of a variety of systems and/or processes may be utilized in accordance with embodiments of the disclosure. For example, the architecture 100 could comprise any variety of endpoints, spine switches, and/or leaf switches. The elements depicted in FIG. 1 may also be interchangeable with other elements of FIGS. 2-10 as required to realize a particularly desired embodiment.

Figure 2:
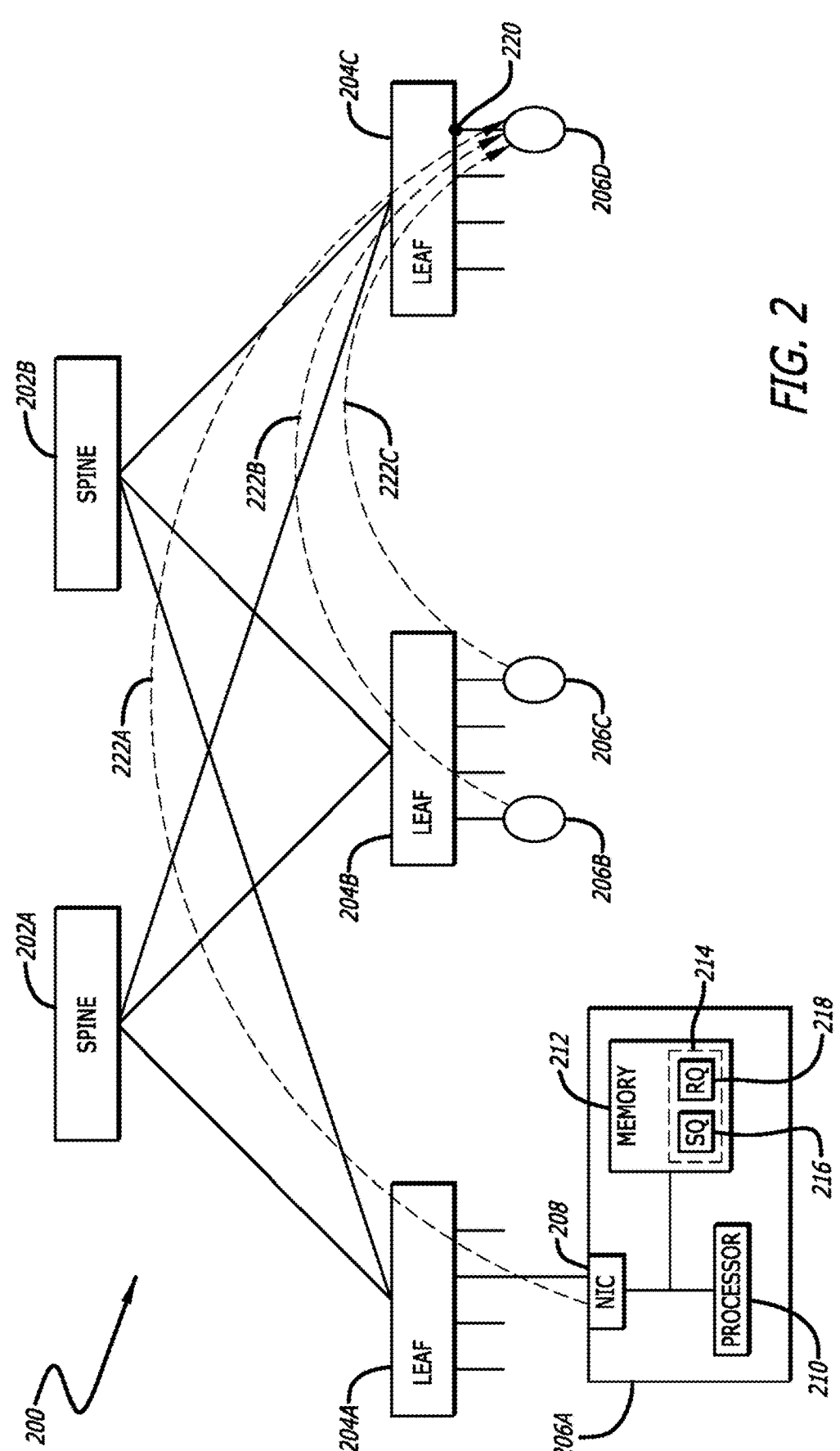
FIG. 2 is a schematic block diagram of an example computing system in accordance with various embodiments of the disclosure.

Referring to FIG. 2, a schematic block diagram of an example computing system 200 in accordance with various embodiments of the disclosure is shown. The computing system 200 can include first and second spine switches 202A and 202B (collectively "spine switches 202") connected to first through third leaf switches 204A-C (collectively "leaf switches 204"), and first through fourth endpoint devices 206A-D (collectively "endpoint devices 206") connected to the leaf switches 204. As those skilled in the art will recognize, the spine switches 202 and the leaf switches 204 can form a high-speed, high-bandwidth interconnect system that enables multiple devices (e.g., the endpoint devices 206) to communicate with each other efficiently and reliably. For example, the spine switches 202 and the leaf switches 204 may form a network based on a Packet Sequence Number (PSN) based Remote Direct Memory Access (RDMA) protocol, for example, RDMA over Converged Ethernet version 2 (RoCEv2) protocol. Further, the network may utilize the PSN based RDMA protocol in a Reliable Connection (RC) mode. The computing system 200 may be used in various applications, such as, for example, data centers, systems providing cloud services, high-performance computing and distributed computing.

In many embodiments, the spine switches 202 are network devices that interconnect and facilitate communication between the leaf switches 204. The spine switches 202 may be configured to route traffic between different leaf switches 204. In some examples, the spine switches 202 can be L3 switches. Further, the spine switches 202 can support various capabilities, such as, but not limited to, 40 or 10 Gbps Ethernet speeds. For example, the spine switches 202 can be configured with one or more 40 Gigabit Ethernet ports to enable 40 Gbps Ethernet speeds. In a number of embodiments, each port can also be split to support other speeds.

For example, a 40 Gigabit Ethernet port can be split into four 10 Gigabit Ethernet ports, although a variety of other combinations are available.

In a variety of embodiments, the leaf switches 204 are network devices that represent physical network edge. In some examples, the leaf switches 204 can be top-of-rack ("ToR") switches configured according to a ToR architecture. In other examples, the leaf switches 204 can be aggregation switches in any particular topology, such as end-of-row (EoR) or middle-of-row (MoR) topologies. The leaf switches 204 may be configured to serve as connection points for the endpoint devices 206. Further, the leaf switches 204 may be configured to aggregate traffic from the endpoint devices 206 and forward it to the spine switches 202. The leaf switches 204 can function as ingress and egress switches. The leaf switches 204 may not be directly connected to each other, but can be connected indirectly through the spine switches 202. In some examples, a number of uplinks from a leaf switch is equal to a number of spine switches, and a number of downlinks from a spine switch is equal to the number of leaf switches.

In additional embodiments, an endpoint device 206; may comprise a network interface controller (NIC) 208, a processor 210, and a memory 212 coupled to each other via a communication bus. Here, subscript "i" indicates that this configuration can be present in any endpoint device 206A-D. In FIG. 2, an exploded view of only one endpoint device 206A is shown for illustrative purposes.

The NIC 208 may include a gigabit Ethernet adapter or any similar component that may connect endpoint device 206; to other devices, for example, one of the leaf switches 204. The NIC 208 can provide the required interface (e.g., input ports and output ports) to connect the endpoint device 206; to one of the leaf switches 204. The NIC 208 can be configured to handle transmission and reception of packets, implementing PSN based RDMA protocols (e.g., RoCEv2 protocol) to ensure compatibility and interoperability within the network.

The processor 210 may include any suitable type of processor or a central processing unit (CPU). The processor 210 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The memory 212 may reside within or externally to the endpoint device 206; and may include any suitable type of memory implemented using any suitable storage technology. For example, in additional embodiments, the memory 212 may comprise a Random Access Memory (RAM), a Non-volatile Memory (NVM) or a combination of a RAM and an NVM. In more embodiments, the memory 212 may be configured to store one or more Queue Pairs (QPs), for example, a QP 214. The QP 214 may include a Send Queue (SQ) 216 and a Receive Queue (RQ) 216. The SQ 216 may be configured to store outbound data (e.g., packets) that is to be transmitted via the NIC 208 for requesting RDMA operations and the RQ 218 may be configured to store inbound data (e.g., packets) received by the NIC 208. In other words, data in the SQ 216 may be processed and transmitted to one of the connected leaf switches 204 via an output port of the NIC 208. Further, data received at an input port of the NIC 208 is stored in the RQ 218. In scenarios where a Reliable Connection (RC) is established between two endpoint devices, QPs are referred to as RC QPs. One RC QP can be connected (e.g., send and receive messages) to exactly one other RC QP in a reliable way. Thus, ensuring that messages/packets are delivered from a sender to a receiver in order and without corruption. Message transfer between two reliably connected endpoint devices can be referred to as an RC flow. Thus, one RC QP can be associated with one RC flow.

In additional embodiments, the leaf switches 204 may be configured to implement a congestion management logic to detect and manage incast congestion events. For example, in many-to-one communication scenarios (such as All-to-All, All-Reduce, All-Gather, or the like), multiple endpoint devices 206 simultaneously start transmitting packets (e.g., data) to a single endpoint device. The single endpoint device may be coupled to an output port of one of the leaf switches 204. Such simultaneous transmissions from multiple endpoint devices to the single endpoint device may cause an overflow in an output port buffer of the output port connected to the single endpoint device. An output port buffer may be configured to temporarily store outbound data of a corresponding output port. Thus, when a leaf switch detects multiple transmissions converging on one output port and an overflow in a corresponding output port buffer, the leaf switch may detect such an event as an incast congestion event.

In an example scenario depicted in FIG. 2, the fourth endpoint device 206D is shown to be coupled to an output port 220 of the third leaf switch 204C. Further, the first through third endpoint devices 206A-C are shown to be simultaneously transmitting data (e.g., packets) 222A, 222B, 222C towards the fourth endpoint device 206D, respectively. Such simultaneous transmissions 222A, 222B, and 222C towards the fourth endpoint device 206D may cause an overflow of an output port buffer of the output port 220. Overflow of an output port buffer may occur when a count of incoming packets exceeds an output buffer threshold. Output buffer threshold may be a dynamically set threshold which when breached or exceeded can trigger actions or behaviors in a network device, typically e.g., a leaf switch. In response to multiple transmissions converging on the output port 220 and the count of incoming packets exceeding the output buffer threshold, the third leaf switch 204C may detect an incast congestion event. In other words, a leaf switch can detect an incast congestion event based on an output buffer threshold associated with a corresponding output port buffer. In some examples, the output buffer of the output port 220 may have a capacity of "10" packets and the output buffer threshold can be '8' packets. Thus, when the number of packets in the output buffer exceeds '8', the third leaf switch 204C can detect an incast congestion event.

In numerous embodiments, the leaf switches 204 can employ various other methods to detect incast congestions, for example, packet loss monitoring, predictive analytics, feedback from receivers, or the like. In packet loss monitoring method, leaf switches 204 can detect incast congestion events by monitoring packet loss rates. For example, when congestion occurs, packets may be dropped due to buffer overflow and by tracking such packet loss, the leaf switches 204 can detect incast congestion and also identify incast congestion hotspots (e.g., output ports). In predictive analytics method, the leaf switches 204 may utilize one or more predictive analytics algorithms to anticipate incast congestion based on historical data and traffic patterns. In feedback method, a leaf switch (e.g., any of the leaf switches 204) may receive a feedback from an endpoint device regarding their capacity breach. Such feedback followed by a determination by the leaf switch 204 that multiple endpoint devices are transmitting data to the same endpoint device, from which the feedback was received, may indicate occurrence of an incast congestion event.

Typically, PSN based RDMA protocols ensure a lossless ethernet network by enabling priority flow control (PFC) globally in the network fabric. PFC can pause output ports of sending endpoint devices when buffers are not available on an input port of a receiving endpoint device to ensure lossless delivery. However, when an output port of a leaf switch is paused, output buffer of the leaf switch may also get exhausted and a back pressure may propagate towards spine uplinks. For example, PFC may pause a spine uplink that connects a leaf switch, experiencing congestion, to a spine switch. As PFC is asserted towards the network core, it can victimize unrelated flows (destined to a different switch port) that happen to share the same paused traffic-class on the spine to leaf downlink. For example, when the spine uplink connecting the leaf switch to the spine switch is paused due to PFC, unrelated traffic flows from the spine switch that were meant for other output ports of the leaf switch also get paused. In general, PFC can work well for transient congestions but can result in severe performance degradation (for example, congestion spreading, head-of line blocking, increased network latency and job completion times, and emergence of victim flows) when large bandwidth flows cause incast congestion. Various embodiments for incast congestion management in a PFC enabled RDMA network are described later in conjunction with FIGS. 3-10.

The computing system 200 depicted in FIG. 2 is shown as a simplified, conceptual computing system. Those skilled in the art will understand that a computing system 200 can include a large variety of devices (e.g., endpoint devices, leaf switches, and spine switches) and be arranged in a virtually limitless number of combinations based on the desired application and available deployment environment.

Although a specific embodiment for a computing system following a spine-leaf architecture suitable for carrying out the various steps, processes, methods, and operations described herein is discussed with respect to FIG. 2, any of a variety of systems and/or processes may be utilized in accordance with embodiments of the disclosure. For example, the computing system 200 can follow any network architecture such as 'fat tree' architecture. The elements depicted in FIG. 2 may also be interchangeable with other elements of FIGS. 1 and 3-10 as required to realize a particularly desired embodiment.

Figure 3:
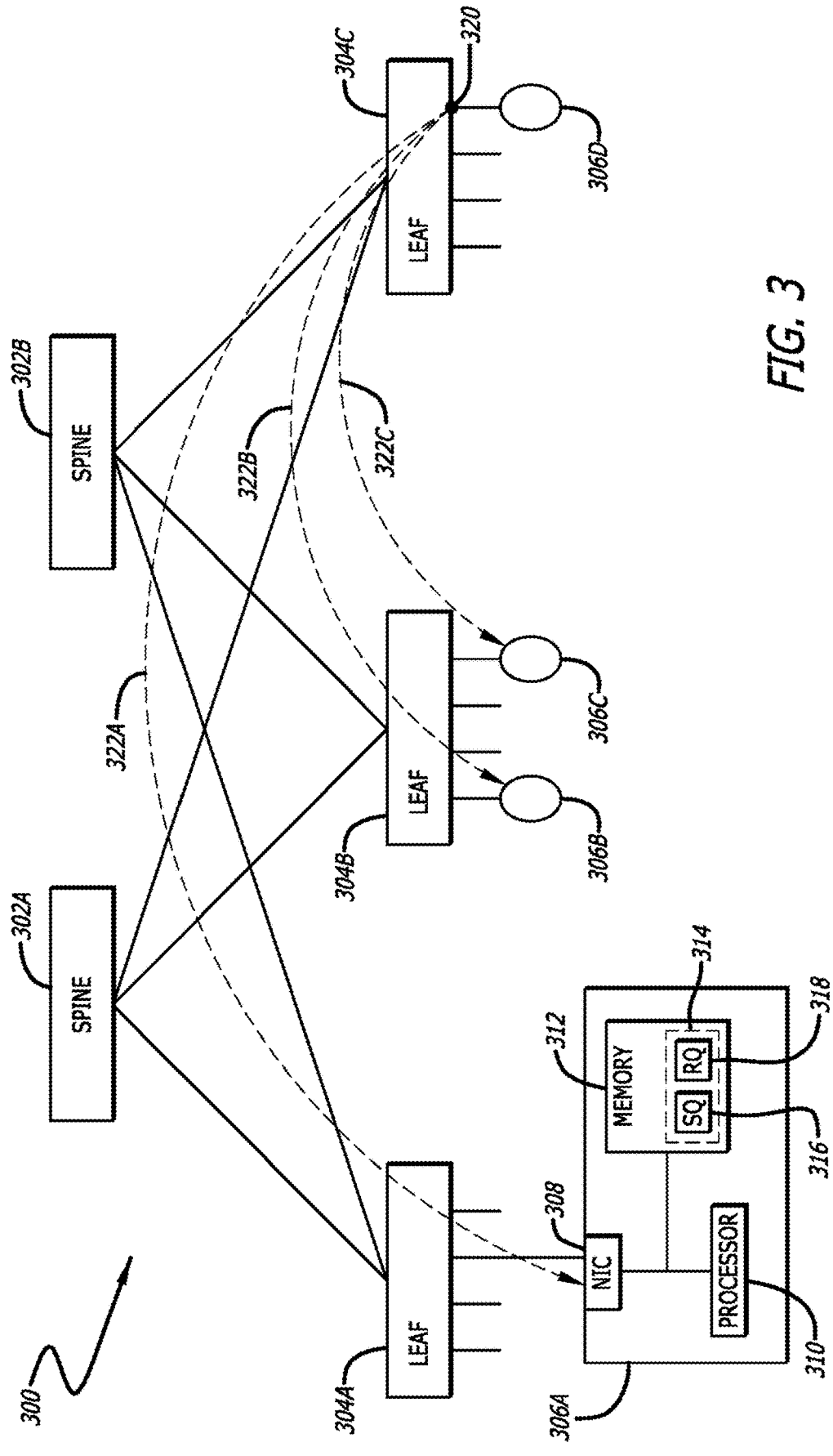
FIG. 3 is a schematic block diagram of an example computing system that employs a congestion management scheme to handle incast congestion in accordance with various embodiments of the disclosure.

Referring to FIG. 3, a schematic block diagram of an example computing system 300 that employs a congestion management scheme to handle incast congestion in accordance with various embodiments of the disclosure is shown. The computing system 300 can include first and second spine switches 302A and 302B (collectively "spine switches 302") connected to first through third leaf switches 304A-C (collectively "leaf switches 304"), and first through fourth endpoint devices 306A-D (collectively "endpoint devices 306") connected to the leaf switches 304. As those skilled in the art will recognize, the spine switches 302 and the leaf switches 304 can form a high-speed, high-bandwidth interconnect system that enables multiple devices (e.g., the endpoint devices 306) to communicate with each other efficiently and reliably. For example, the spine switches 302 and the leaf switches 304 may form a network based on a PSN based RDMA protocol (e.g., RoCEv2 protocol). Further, the network may utilize the PSN based RDMA protocol in an RC mode. In many embodiments, the network can be priority flow control (PFC) enabled. An endpoint device 306; can include a NIC 308, a processor 310, and a memory 312. Further, the memory 312 may include one or more RC QPs 314, each associated with one RC flow. Each RC QP 314 may include an SQ 316 and an RQ 318. While an exploded view of only one endpoint device 306A is shown in FIG. 3 for illustrative purposes, subscript "i" indicates that this configuration can be present in any endpoint device 306A-D.

For the sake of brevity, the congestion management scheme has been described in FIG. 3 with respect to the third leaf switch 304C. However, all leaf switches 304 in the computing system 300 are capable of executing the congestion management scheme for detecting and managing incast congestion events in a manner as described below for the third leaf switch 304C.

The embodiments depicted in FIG. 3 may show a scenario where the third leaf switch 304C has detected an occurrence of an incast congestion event at an output port 320 connected to the fourth endpoint device 306D. The incast congestion event may have occurred due to multiple endpoint devices (e.g., the first through third endpoint devices 306A-C) simultaneously transmitting data to the fourth endpoint device 306D and breaching an output buffer threshold associated with the output port 320.

In a number of embodiments, in response to detecting the incast congestion event at the output port 320, the third leaf switch 304C may be configured to identify one or more RC QPs that are associated with the incast congestion event. An RC QP of an endpoint device is identified to be associated with the incast congestion event when data is being transmitted from an SQ of the RC QP to the fourth endpoint device 306D at the time the incast congestion event was detected. For example, the third leaf switch 304C may identify that the RC QP 314 is associated with the incast congestion event, when packets are being transmitted by the SQ 316 to the fourth endpoint device 306D at the time the incast congestion event was detected and a last packet of a message for the corresponding RC flow is yet to be transmitted by the SQ 316. Likewise, the third leaf switch 304C may further identify RC QPs of the second endpoint device 306B and the third endpoint device 306C to be associated with the incast congestion event.

In a variety of embodiments, upon identifying the RC QPs, the third leaf switch 304C may notify the identified RC QPs using Receiver Not Ready (RNR) negative acknowledgements (NACKs). In additional embodiments, these RNR NACKs may be associated with unique and staggered pause time-periods. Each RNR NACK may cause the SQ of the corresponding RC QP to pause and retry packet transmission, after the pause time-period ends.

In more embodiments, the third leaf switch 304C may utilize packet trimming and back to sender (BTS) capabilities to generate these RNR NACKs. The third leaf switch 304C may identify a first-to-be-dropped packet associated with each identified RC QP. The first-to-be-dropped packet may correspond to a first packet from an RC flow that will get dropped at a leaf switch due to an incast congestion event. For example, for an RC flow associated with the RC QP 314, the third leaf switch 304C may identify a packet 'P1' as the first-to-be-dropped packet.

In numerous embodiments, the third leaf switch 304C may be configured to identify those first-to-be-dropped packets that are associated with a PSN based RDMA protocol (e.g., RoCEv2 protocol). For example, the third leaf switch 304C may check a destination port number and/or an opcode field in one or more headers of a packet to verify if the packet corresponds to any PSN based RDMA protocol. In some examples, if the destination port number of a packet is set to "4791", an Internet Assigned Numbers Authority (IANA) designated port number for RoCEv2 RC traffic, the third leaf switch 304C may determine that the packet corresponds to the RoCEv2 RC protocol. In further examples, if a Base Transport Header (BTH) of the packet contains specific values (e.g., "000" in bits [7:5] of the opcode field), the third leaf switch 304C may determine that the packet corresponds to the RoCEv2 RC protocol.

Once the first-to-be-dropped packet for each contributing RC QP is identified, the third leaf switch 304C may implement the packet trimming and BTS capabilities on each first-to-be-dropped packet to generate a corresponding RNR NACK. For the sake of brevity, generation of an RNR NACK is described with respect to the first-to-be-dropped packet "P1" associated with the RC QP 314.

In additional embodiments, the third leaf switch 304C may trim a payload of the packet "P1" and swap source information and destination information in the one or more headers of the packet "P1". Examples of the source information may include source Internet Protocol (IP) address and source port number. Likewise, examples of the destination information may include destination IP address and destination port number. In other words, in the one or more headers of the trimmed packet "P1", the source and destination IP addresses are swapped (or interchanged) and the source and destination port numbers are swapped. Swapping the source information and the destination information may enable sending a formatted packet "P1" back to its sender (e.g., the first endpoint device 306A).

Figure 4:
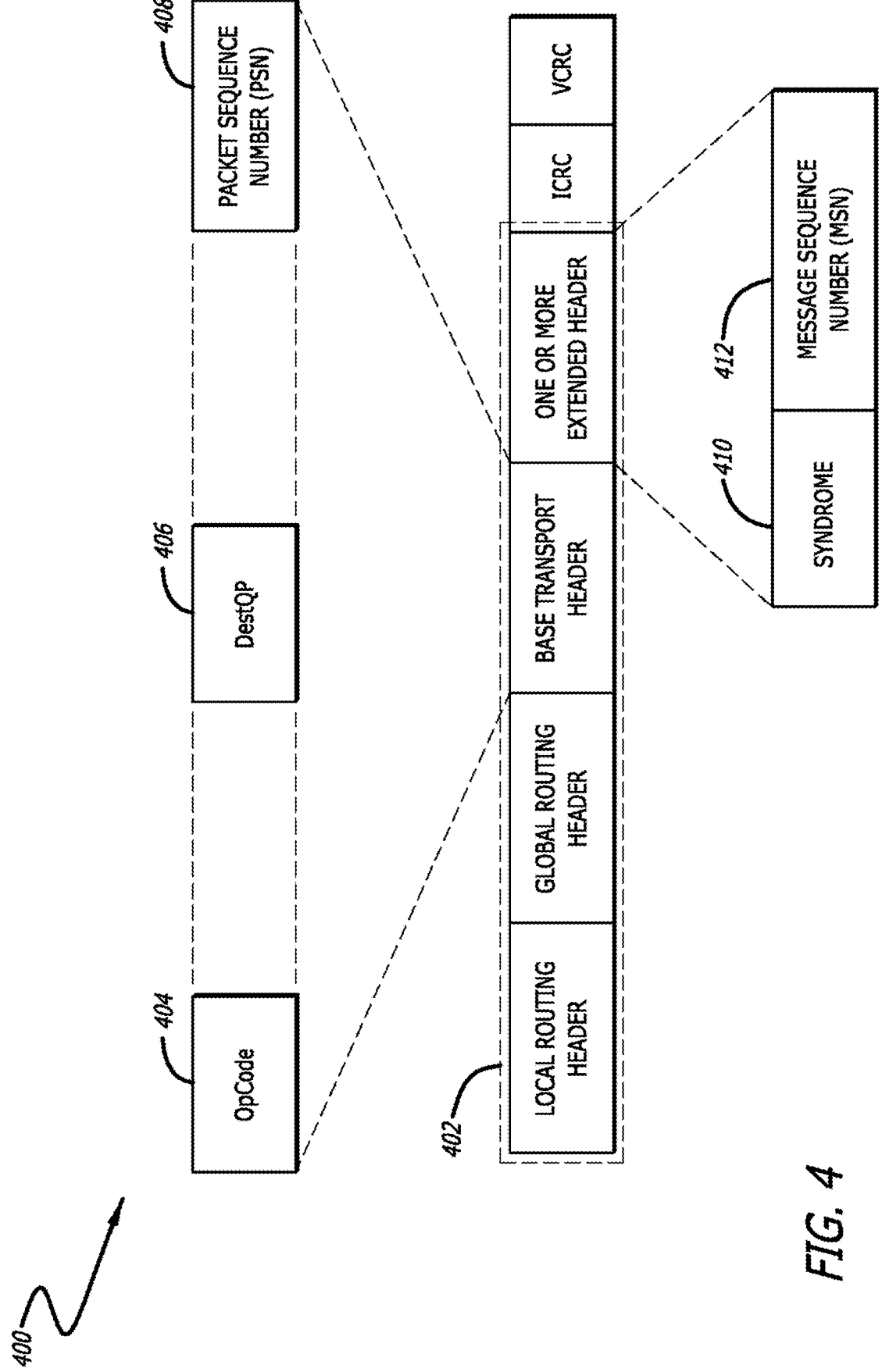
FIG. 4 is a schematic block diagram of an example NACK format in accordance with various embodiments of the disclosure.

In further embodiments, the third leaf switch 304C may convert a request packet format of the first-to-be-dropped packet "P1" to a NACK format (for example, NACK format 400 shown in FIG. 4). The NACK format may include a reason code field, a message sequence number (MSN) field, a packet sequence number (PSN) field, a destination QP field, a syndrome field, and many other required fields. The reason code field may indicate a reason code or error code indicating a nature of the problem encountered by a receiving endpoint device. The MSN field may contain a value that uniquely identifies a message to which the NACK response pertains. The MSN field may be 24 bits in length. The PSN field may contain a value that uniquely identifies a packet. PSN is a monotonically increasing number that is used to mark packet order. PSN in the NACK format may indicate that a packet with the PSN had an error and requests packet retransmission. The destination QP field may contain an identifier of an RC QP to which the NACK is to be sent. The syndrome field may contain a pause time-period value that indicates a time period after which the RC QP to which NACK is to be sent can retry packet transmission starting from the PSN included in the NACK.

In still more embodiments, to generate the RNR NACK for the RC QP 314, the third leaf switch 304C may be configured to populate information in various fields (for example, the reason code field, the MSN field, the PSN field, the destination QP field, the syndrome field, or the like) of the NACK format. In the current context, the third leaf switch 304C may add an RNR code (e.g., a code for receiver not ready indication) to the reason code field to indicate that the receiving endpoint 306D is not ready to receive data. In the PSN field, the third leaf switch 304C may add a PSN of the first-to-be-dropped packet "P1" to indicate that the first endpoint device 306A should resume packet transmission from the PSN of the first-to-be-dropped packet "P1". In the syndrome field, the third leaf switch 304C may add a pause time-period value indicating a time interval after which the first endpoint device 306A can resume packet transmission. For example, the syndrome field is usually 8 bits long and the third leaf switch 304C may add the information regarding the pause time-period in the lower 5 bits of the syndrome field. In the MSN field, the third leaf switch 304C may add the MSN value associated with the first-to-be-dropped packet "P1". Likewise, in the destination QP field, the third leaf switch 304C may add a unique identifier of the RC QP 314.

In still further embodiments, prior to updating the syndrome field with the pause time-period value, the third leaf switch 304C may be configured to determine the pause time-period for the RC QP 314. More particularly, the third leaf switch 304C may determine the pause time-period based on a round trip time associated with the network (e.g., the network connecting the RC QP 314 to the RC QP of the fourth endpoint device 306D). Round trip time may refer to the time it takes for a packet to travel from a source to a destination and then back to the source again. The third leaf switch 304C can determine the round trip time by analyzing historical data exchanged between the RC QP 314 and the RC QP of the fourth endpoint device 306D. In some examples, the pause time-period can be randomly selected within the time range of the determined round trip time. Additionally, while determining the pause time-period for the RC QP 314, the third leaf switch 304C may ensure that the pause time-period for the RC QP 314 is unique and is different from pause time-periods of other RC QPs associated with the incast congestion event.

In still additional embodiments, to generate the RNR NACK for the RC QP 314, the third leaf switch 304C may be configured to maintain one or more states for the RC flow associated with the RC QP 314. The one or more states may include the destination QP and the MSN associated with the RC flow. In some examples, to maintain information regarding the destination QP associated with the RC flow, the third leaf switch 304C may be configured snoop one or more incoming packets or acknowledgements (ACKs) associated with the RC flow. Since for a given RC flow, source and destination QPs are fixed, by snooping historical incoming packets or ACKs associated with the RC flow, the third leaf switch 304C can obtain information regarding the destination QP associated with the RC flow. The third leaf switch 304C may utilize the state information maintained for the destination QP to update the destination QP field in the NACK format. In further examples, to maintain information regarding a current MSN associated with an RC flow, the third leaf switch 304C may be configured to snoop one or more ACKs associated with the RC flow and extract the MSN value from the one or more ACKs. Since ACKs associated with packets of the same message include the same MSN, the third leaf switch 304C obtains information regarding the MSN by snooping previous ACKs from the RC QP of the fourth endpoint device 306D to the RC QP 314. Continuous snooping of the ACKs may enable the third leaf switch 304C to maintain accurate state for current MSN. The third leaf switch 304C may utilize the state information maintained for the current MSN to update the MSN field in the NACK format.

Likewise, the third leaf switch 304C may generate one RNR NACK for each RC QP (e.g., one RNR NACK per RC flow) associated with the incast congestion event and transmit the generated RNR NACKs to corresponding RC QPs.

For example, FIG. 3 illustrates first through third RNR NACKs 322A-C being transmitted by the third leaf switch 304C to the RC QPs of the first through third endpoint devices 306A-C, respectively.

In some more embodiments, as the identified RC QPs of the first through third endpoint devices 306A-C receive the first through third RNR NACKs 322A-C, respectively, the SQ of each identified RC QP may pause packet transmission to the fourth endpoint device 306D. In various embodiments, the SQ of each identified RC QP may pause packet transmission until the expiration of the pause time-period indicated in corresponding first through third RNR NACKs 322A-C. For example, the SQ 316 may pause the packet transmission until the expiration of the pause time-period indicated in the first RNR NACK 322A.

In yet more embodiments, in response to the expiration of the pause time-period indicated in the first through third RNR NACKs 322A-C, the SQ of each identified RC QP may resume packet transmission from a packet having the PSN indicated by the corresponding RNR NACK 322A-C. For example, the SQ 316 may resume the packet transmission from the PSN indicated in the first RNR NACK 322A after the expiration of the pause time-period indicated in the first RNR NACK 322A.

Since the RC QPs of the first through third endpoint devices 306A-C that are associated with the incast congestion event retry packet transmission after different pause time-periods indicated by the corresponding first through third RNR NACKs 322A-C, packet transmission from these RC QPs is spaced out. Thus, avoiding all packets reaching the output port 320 at the same time when transmission resumes. In other words, the above described incast congestion management scheme not only enables the third leaf switch 304C to manage and recover from the detected incast congestion event, it also reduces a possibility of re-occurrence of the incast congestion event at the same output port 320 when the RC QPs of the first through third endpoint devices 306A-C restart packet transmission. Additionally, since packet transmission is paused on RC flow basis, unrelated RC flows reaching the third leaf switch 304C do not get affected. In other words, the above described incast congestion management scheme only acts on the RC flows of the RC QPs associated with the incast congestion event and RC flows of other RC QPs that are not associated with the incast congestion event remain unaffected. Additionally, no hardware or software changes are required at NIC level in the endpoint devices 306 to support the incast congestion management scheme of the present disclosure.

Although a specific embodiment for a computing system 300 employing a congestion management scheme to handle incast congestion suitable for carrying out the various steps, processes, methods, and operations described herein is discussed with respect to FIG. 3, any of a variety of systems and/or processes may be utilized in accordance with embodiments of the disclosure. For example, instead of assigning a different pause time-period to each RNR NACK, a leaf switch can assign same pause time-period to some RNR NACKs while keeping the pause time-period in other RNR NACKs to be different to reduce packet transmission time for the RC flow. The elements depicted in FIG. 3 may also be interchangeable with other elements of FIGS. 1-2 and 4-10 as required to realize a particularly desired embodiment.

Referring to FIG. 4, a schematic block diagram of an example NACK format 400 in accordance with various embodiments of the disclosure is shown. The embodiments depicted in FIG. 4 may show the NACK format 400 of an RNR NACK transmitted by a leaf switch to an RC QP of a sending endpoint device associated with an incast congestion event detected by the leaf switch.

In many embodiments, the NACK format 400 may include one or more headers 402, an invariant cyclic redundancy check (ICRC), and a variant CRC (VCRC). The one or more headers 402 may include a local routing header (LRH), a global routing header (GRH), a base transport header (BTH), and one or more extended headers. The ICRC and the VCRC may ensure data integrity and reliability within RoCEv2 RC transmission.

In a number of embodiments, LRH is used for routing the RNR NACK within a subnet. In a variety of embodiments, GRH is responsible for routing the RNR NACK beyond the local subnet, enabling communication between devices across different subnets within the network. In a number of embodiments, BTH may serve as fundamental transport header for the RNR NACK. In an example, the BTH can be 12 bytes long. BTH may include critical information, for example, an opcode field 404, a destination QP (destQP) field 406, and a PSN field 408. The opcode field 404 may specify a type of RDMA operation (e.g., Send, Read, or Write) performed with a packet associated with the RNR NACK. For example, the opcode field 404 may comprise multiple bits (e.g., [7:0] bits), where bits [7:5] are used to denote the operation type (e.g., Send, Read, or Write), and bits [4:0] are used to specify a subtype of the operation, such as Send Only, Send First, Send Immediate, Send Last, Send Middle, or other variants. In an example, the bits [7:5] in the Opcode field 404 contain values "000" to indicate a PSN based RDMA protocol (e.g., the RoCEv2 RC protocol). The destQP 406 may contain an identifier of an RC QP to which the RNR NACK is to be sent. The PSN field 408 may be configured to indicate that the packet with the PSN had an error. The PSN is a monotonically increasing number and is uniquely assigned to different packets for marking packet order.

In more embodiments, the one or more extended headers may include a syndrome field 410 and an MSN field 412, along with many other required fields. The syndrome field 410 is usually 8 bits long and may contain information regarding a pause time-period in the lower 5 bits. The pause time-period may refer to a time-period for which the RC QP of the sending endpoint device is required to pause data transmission from a corresponding SQ. The transmission may be paused to recover from the incast congestion event caused by the data transmission. The MSN field 412 may contain an MSN value of a packet having the PSN indicated in the RNR NACK. The MSN field 412 can be 24 bits long.

In additional embodiments, as the RC QP associated with the destination QP included in the destQP field 406 receives the RNR NACK, the SQ of the RC QP may pause packet transmission. The SQ of the RC QP may pause packet transmission until the expiration of the pause time-period indicated in the syndrome field 410 of the RNR NACK. In response to expiration of the pause time-period, the SQ of the RC QP may resume packet transmission from a packet having the PSN indicated in the PSN field 408. Such temporary pause of packet transmission from multiple RC QPs can enable the leaf switch to recover from the incast congestion event without asserting PFC in the network.

Although a specific embodiment for a NACK format suitable for carrying out the various steps, processes, methods, and operations described herein is discussed with respect to FIG. 4, any of a variety of systems and/or processes may be utilized in accordance with embodiments of the disclosure. For example, the leaf switch may assign a high priority traffic class to the RNR NACK and prioritize transmission of the RNR NACK over transmission of other NACKs and acknowledgments (ACKs) associated with lower priority traffic classes to speed up the recovery from the incast congestion event. The elements depicted in FIG. 4 may also be interchangeable with other elements of FIGS. 1-3 and 5-10 as required to realize a particularly desired embodiment.

Referring to FIG. 5, a flowchart showing a process 500 for incast congestion management in accordance with various embodiments of the disclosure is shown. In many embodiments, the process 500 may receive a plurality of packets (block 510). The process 500 may receive the plurality of packets from a plurality of sending endpoint devices, for example, GPUs, servers, IoT devices, mobile devices, or the like. Each sending endpoint device may include an RC QP associated with one RC flow. The RC QP may include an SQ and an RQ. The SQ may store outbound data for transmission and the RQ may store inbound data received by the sending endpoint device. Each packet may be associated with a unique PSN. In a number of embodiments, the plurality of packets may be associated with a PSN based RDMA protocol, for example, the RoCEv2 RC protocol.

In a variety of embodiments, the process 500 may determine if an incast congestion event is detected (block 515). The process 500 may detect the incast congestion event when RC QPs of multiple sending endpoint devices simultaneously transmit data (e.g., packets) towards the same receiving endpoint device and when an output port buffer of an output port connected to the receiving endpoint device overflows. Overflow of the output port buffer may occur when a count of packets stored in the output port buffer exceeds an output buffer threshold. Output buffer threshold may be a dynamically set threshold which when breached or exceeded can trigger actions or behaviors in a network device, typically e.g., a leaf switch. In other words, when multiple RC flow transmissions converge on the same output port and the count of incoming packets exceeds the output buffer threshold, the process 500 may detect the incast congestion event.

In further embodiments, when the incast congestion event is not detected, the process 500 may transmit the plurality of packets to corresponding destinations (block 520). When packets stored in the output buffer of the output port does not exceed the output buffer threshold, the process 500 may not detect the incast congestion event. For example, when output buffer of each output port in a leaf switch is utilized below the output buffer threshold, the process 500 may forward the received plurality of packets to corresponding receiving endpoint devices connected to the output ports of the leaf switch. For example, the process 500 may forward the packets to the receiving endpoint devices through an appropriate output port, for example, an output port mapped to a Media Access Control (MAC) address of the receiving endpoint device. The process 500 may again receive a new plurality of packets (block 510).

However, when the incast congestion event is detected, the process 500 may identify one or more RC QPs associated with the incast congestion event (block 530). An RC QP of a sending endpoint device is identified as a contributor to the incast congestion event when data transmitted by an SQ of the RC QP is routed via the output port at which the incast congestion event is detected. Thus, when data transmitted by an SQ of an RC QP is routed via another output port where the incast congestion event is not detected, the RC QP is not determined as a contributor to the incast congestion event.

In still further embodiments, the process 500 may generate a NACK for an RC QP of the one or more RC QPs (block 540). Upon identifying the one or more RC QPs, the process 500 may generate an RNR NACK for each identified RC QP. For example, the process 500 may generate one RNR NACK per RC flow. In additional embodiments, these RNR NACKs may be associated with unique and staggered pause time-periods. Each RNR NACK may be configured to cause the SQ of the corresponding RC QP to pause and retry packet transmission, after the pause time-period ends. In some more embodiments, the process 500 may utilize packet trimming and BTS capabilities to generate these RNR NACKs.

In numerous embodiments, the process 500 may transmit the NACK to a network device associated with the RC QP (block 550). Here, the network device is the sending endpoint network device associated with the RC QP. For example, the process 500 may transmit the generated RNR NACKs to the one or more RC QPs associated with the incast congestion event. As the identified one or more RC QPs receive the RNR NACKs, the SQ of each identified RC QP may pause packet transmission to the receiving endpoint device. In numerous more embodiments, the SQ of each identified RC QP may pause packet transmission until the expiration of the pause time-period indicated in the corresponding RNR NACK. Since an RNR NACK is only meant to target an RC QP, which is associated with incast congestion, of a sending endpoint device, other RC QPs of the sending endpoint device continue data transmission to other receiving endpoint devices without interruption or pause.

In various embodiments, the process 500 may determine one or more first packets among the plurality of packets that are to be dropped due to the incast congestion event (block 560). Among the received plurality of packets, the process 500 may determine which all packets are received from the one or more RC QPs associated with the incast congestion event. The packets that are received from such one or more RC QPs are referred to as the one or more first packets.

In yet more embodiments, the process 500 may drop the one or more first packets among the plurality of packets (block 570). Since the receiving endpoint device is unable to process any new packet due to the incast congestion event, the one or more first packets are dropped (or discarded) by the process 500. The discard of the one or more first packets may instantly relieve the incast congestion on the output port. Further, the PSNs added to the RNR NACKs ensure that there is no packet loss due to the incast congestion event. For example, the expected PSN for each paused RC flow at the receiving endpoint device is set as the PSN of the first-dropped-packet mentioned in the RNR NACK associated with the RC flow. Thus, any subsequent packet to the first-dropped-packet of an RC flow that did get through to the receiving endpoint device during the waning phase of the incast congestion event is discarded by the receiving endpoint device due to mismatch with the expected PSN. Upon the expiration of the corresponding pause time-periods, the SQ of the one or more RC QPs resume packet transmission.

In many further embodiments, the process 500 may transmit, to respective destinations, remaining one or more second packets among the plurality of packets (block 580). Among the received plurality of packets, the process 500 may determine which all packets are received from other RC QPs that are not associated with the incast congestion event. The packets that are received from the other RC QPs are referred to as the one or more second packets. Thus, the process 500 ensures that no unrelated RC flows (e.g., RC flows from non-contributing RC QPs) are victimized by the incast congestion management scheme.

Although a specific embodiment for incast congestion management suitable for carrying out the various steps, processes, methods, and operations described herein is discussed with respect to FIG. 5, any of a variety of systems and/or processes may be utilized in accordance with embodiments of the disclosure. For example, the process 500 may employ various other methods to detect incast congestion, for example, packet loss monitoring, predictive analytics, feedback from receivers, or the like. The elements depicted in FIG. 5 may also be interchangeable with other elements of FIGS. 1-4 and 6-10 as required to realize a particularly desired embodiment.

Referring to FIG. 6, a flowchart showing a process 600 for incast congestion management in accordance with various embodiments of the disclosure is shown. In many embodiments, the process 600 may detect an incast congestion event (block 610). The process 600 may detect the incast congestion event when RC QPs of multiple sending endpoint devices simultaneously transmit data (e.g., packets) towards the same receiving endpoint device and when an output port buffer of an output port connected to the receiving endpoint device overflows. Overflow of the output port buffer may occur when a count of packets stored in the output port buffer exceeds an output buffer threshold. In other words, when multiple RC flow transmissions converge on the same output port and the count of incoming packets exceeds the output buffer threshold, the process 600 may detect the incast congestion event. Examples of the sending endpoint devices may include, but are not limited to, GPUs, servers, IoT devices, mobile devices, or the like.

In a number of embodiments, the process 600 may identify one or more RC QPs associated with the incast congestion event (block 620). An RC QP of a sending endpoint device is identified to be associated with the incast congestion event when data transmitted by an SQ of the RC QP is routed via the output port at which the incast congestion event is detected. Thus, when data transmitted by an SQ of an RC QP is routed via another output port where the incast congestion event is not detected, the RC QP is not determined to be associated with the incast congestion event.

In a variety of embodiments, the process 600 may determine a pause time-period for an RC QP of the one or more RC QPs (block 630). More particularly, the process 600 may determine the pause time-period for each RC QP associated with the incast congestion event based on a round trip time associated with the network. Round trip time may refer to the time it takes for a packet to travel from a source to a destination and then back to the source again. In additional embodiments, the process 600 can determine the round trip time by analyzing historical data exchanged between one or more sending endpoint devices and the receiving endpoint device. In some examples, the pause time-period can be randomly selected within the time range defined by the determined round trip time. In some more embodiments, the process 600 may determine unique pause time-periods for the one or more RC QPs associated with the incast congestion event.

In still further embodiments, the process 600 may generate a NACK for an RC QP of the one or more RC QPs (block 640). Upon identifying the one or more RC QPs associated with the incast congestion event, the process 600 may generate an RNR NACK for each identified RC QP. For example, the process 600 may generate one RNR NACK per RC flow. Each RNR NACK may be configured to cause the SQ of the corresponding RC QP to pause and retry packet transmission, after the pause time-period ends. In some more embodiments, the process 600 may utilize packet trimming and BTS capabilities to generate these RNR NACKs.

In numerous embodiments, the process 600 may transmit the NACK to a network device associated with the RC QP (block 650). Here, the network device is the sending endpoint network device associated with the identified RC QP. For example, the process 600 may transmit the generated RNR NACKs to the one or more RC QPs associated with the incast congestion event, one RNR NACK per RC QP. As the one or more RC QPs receive the RNR NACKs, the SQ of each identified RC QP may pause packet transmission to the receiving endpoint device. In numerous more embodiments, the SQ of each identified RC QP may pause packet transmission until the expiration of the pause time-period indicated in the corresponding RNR NACK. Since an RNR NACK is only meant to target an RC QP, associated with the incast congestion event, of a sending endpoint device, other RC QPs of the sending endpoint device continue data transmission to other receiving endpoint devices without interruption or pause.

In yet more embodiments, the process 600 may drop one or more packets that are associated with the RC QP (block 660). In various embodiments, the process 600 may determine the one or more packets that are to be dropped due to the incast congestion event. Since the receiving endpoint device is unable to process any new packet due to the incast congestion event, the process 600 determines the one or more packets for dropping. For example, the process 600 may determine the one or more packets received from the one or more RC QPs associated with the incast congestion event as candidates for packet dropping. The discard of the one or more packets may instantly relieve the incast congestion on the output port.

In many further embodiments, the process 600 may transmit one or more new packets received from the RC QP, after the expiration of the pause time-period, to respective destination (block 670). In response to the expiration of the pause time-period indicated in the RNR NACKs, the SQ of each RC QP may resume packet transmission from a packet having the PSN indicated by the corresponding RNR NACK. When such staggered packet transmission resumes, the process 600 may transmit (e.g., forward) the one or more new packets received from the one or more RC QPs to the receiving endpoint device. Since the one or more RC QPs retry packet transmission after different pause time-periods indicated by the corresponding RNR NACKs, packet transmission from the one or more RC QPs is spaced out. Thus, avoiding all packets reaching the output port at the same time when transmission resumes.

Although a specific embodiment for incast congestion management suitable for carrying out the various steps, processes, methods, and operations described herein is discussed with respect to FIG. 6, any of a variety of systems and/or processes may be utilized in accordance with embodiments of the disclosure. For example, each RC QP associated with the incast congestion event may attempt packet retransmission for "n" times as indicated in the corresponding RNR NACK upon timeout. The elements depicted in FIG. 6 may also be interchangeable with other elements of FIGS. 1-5 and 7-10 as required to realize a particularly desired embodiment.

Referring to FIG. 7, a flowchart showing a process 700 for incast congestion management in accordance with various embodiments of the disclosure is shown. In many embodiments, the process 700 may detect an incast congestion event (block 710). The process 700 may detect the incast congestion event when RC QPs of multiple sending endpoint devices simultaneously transmit data (e.g., packets) towards the same receiving endpoint device and when an output port buffer of an output port connected to the receiving endpoint device overflows. In other words, when multiple RC flow transmissions converge on the same output port and a count of incoming packets exceeds an output buffer threshold, the process 700 may detect the incast congestion event.

In a number of embodiments, the process 700 may identify one or more RC QPs associated with the incast congestion event (block 720). An RC QP of a sending endpoint device is identified to be associated with the incast congestion event when data transmitted by an SQ of the RC QP is routed via the output port at which the incast congestion event is detected. Thus, when data transmitted by an SQ of an RC QP is routed via another output port where the incast congestion event is not detected, the RC QP is not determined to be associated with the incast congestion event.

In a variety of embodiments, the process 700 may determine a pause time-period for an RC QP of the one or more RC QPs (block 730). More particularly, the process 700 may determine the pause time-period for each RC QP associated with the incast congestion event based on a round trip time associated with the network. Round trip time may refer to the time it takes for a packet to travel from a source to a destination and then back to the source again. In additional embodiments, the process 700 can determine the round trip time by analyzing historical data exchanged between one or more sending endpoint devices and the receiving endpoint device. In some examples, the pause time-period can be randomly selected within the time range defined by the determined round trip time. In some more embodiments, the process 700 may determine unique pause time-periods for the one or more RC QPs associated with the incast congestion event. In numerous embodiments, the process 700 may identify a first-to-be dropped packet associated with each RC QP in response to the identification of the one or more RC QPs. A first-to-be dropped packet associated with an RC QP may refer to a first packet drop instance for the RC QP due to the incast congestion event when all previous packets of the RC flow are successfully received and processed by the receiving endpoint device.

In still further embodiments, the process 700 may trim a payload from the first-to-be-dropped packet associated with the RC QP (block 740). Thus, for each identified first-to-be dropped packet, the process 700 may trim a corresponding payload. One or more headers of the first-to-be dropped packets may be retained.

In some more embodiments, the process 700 may swap source information and destination information in the first-to-be-dropped packet (block 750). For example, for each identified first-to-be dropped packet, the process 700 may swap source information and destination information. Examples of the source information may include source IP address and source port number. Likewise, examples of the destination information may include destination IP address and destination port number. Swapping the source information and the destination information may enable sending a formatted packet back to its sender.

In numerous embodiments, the process 700 may convert the first-to-be-dropped packet to a NACK format (block 760). For example, for each identified first-to-be dropped packet, the process 700 may convert a request packet format of the first-to-be-dropped packet to a NACK format to generate an RNR NACK for each RC QP associated with the incast congestion event. The NACK format may include a reason code field, an MSN field, a PSN field, a destination QP field, a syndrome field, and many other required fields.

In numerous more embodiments, the process 700 may update the syndrome field in the NACK format to include the pause time-period (block 770). For example, in the NACK format of each converted first-to-be-dropped packet (such as in each RNR NACK), the process 700 may update the syndrome field to include the corresponding pause time-period. In some examples, the syndrome field is 8 bits long and the pause time-period can be updated in the lower 5 bits of the syndrome field. Thus, each RNR NACK is associated with a different pause time-period determined for the corresponding RC QP.

In yet more embodiments, the process 700 may transmit the NACK to a network device associated with the RC QP (block 780). Here, the network device is the sending endpoint network device including the RC QP associated with the incast congestion event. For example, the process 700 may transmit the generated RNR NACKs to the one or more RC QPs associated with the incast congestion event, one RNR NACK per RC QP. As the one or more RC QPs receive the RNR NACKs, the SQ of each associated RC QP may pause packet transmission to the receiving endpoint device. In various embodiments, the SQ of each associated RC QP may pause packet transmission until the expiration of the pause time-period indicated in the corresponding RNR NACK. Since an RNR NACK is only meant to target an RC QP, associated with an incast congestion event, of a sending endpoint device, other RC QPs of the sending endpoint device continue data transmission to other receiving endpoint devices without interruption or pause.

Although a specific embodiment for incast congestion management suitable for carrying out the various steps, processes, methods, and operations described herein is discussed with respect to FIG. 7, any of a variety of systems and/or processes may be utilized in accordance with embodiments of the disclosure. For example, the process 700 may differentiate the incast congestion event from other types of congestion events and manage the incast congestion event by employing the above described incast congestion management scheme while handling the other congestion events using different schemes (e.g., Data Center Quantized Congestion Notification, Explicit Congestion Notification, or the like). The elements depicted in FIG. 7 may also be interchangeable with other elements of FIGS. 1-6 and 8-10 as required to realize a particularly desired embodiment.

Figure 8:
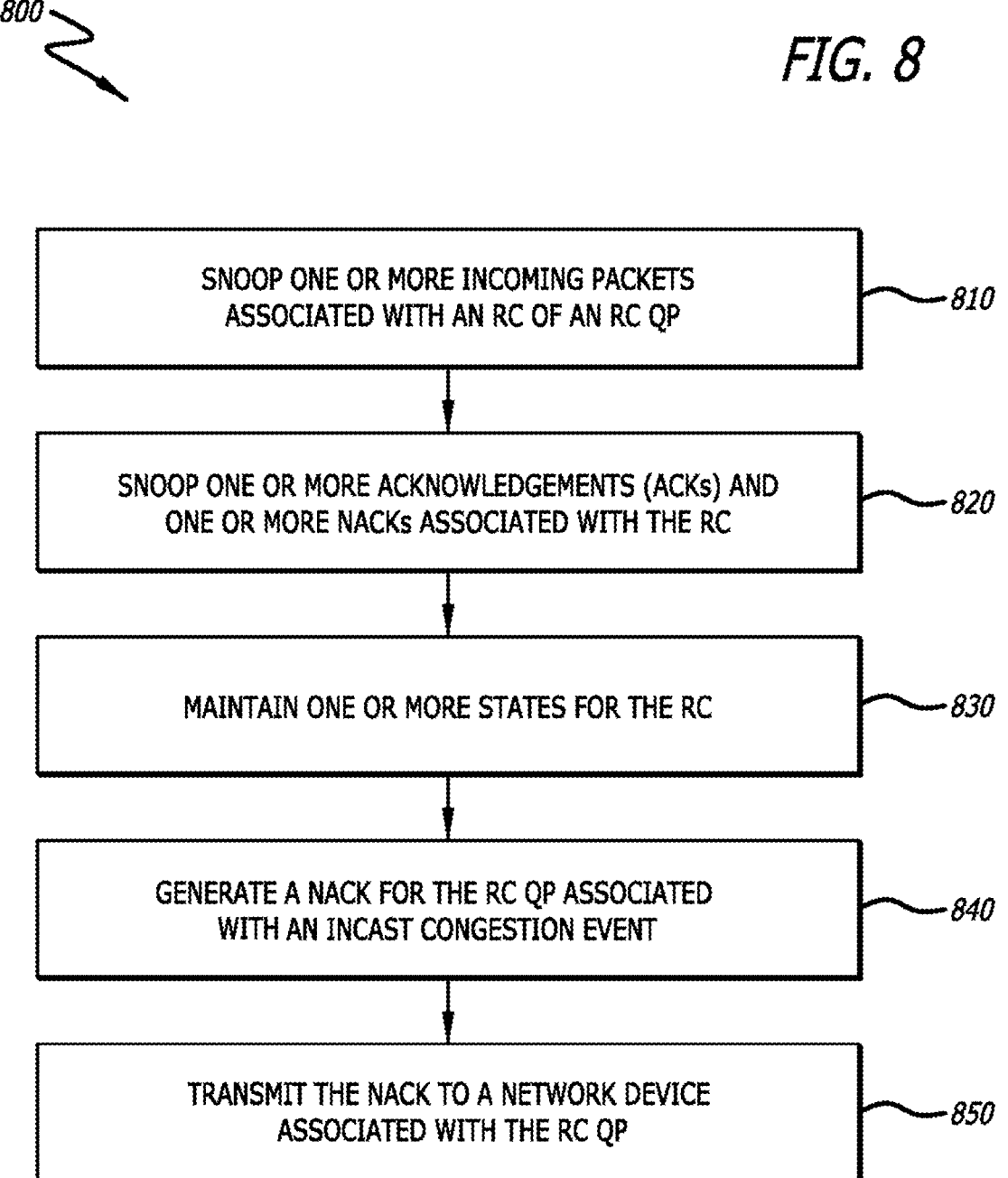
FIG. 8 is a flowchart showing a process for maintaining one or more states for incast congestion management in accordance with various embodiments of the disclosure.

Referring to FIG. 8, a flowchart showing a process 800 for maintaining one or more states for incast congestion management in accordance with various embodiments of the disclosure is shown. In many embodiments, the process 800 may snoop one or more incoming packets associated with an RC of an RC QP (block 810). Since for a given RC flow (also referred to as "RC"), source and destination QPs are fixed, by snooping historical incoming packets or ACKs associated with the RC flow, the process 800 can obtain information regarding the destination QP associated with the RC flow.

In more embodiments, the process 800 may snoop one or more ACKs and one or more NACKs associated with the RC (block 820). Since ACKs associated with packets of the same message include the same MSN, the process 800 obtain information regarding the MSN associated with the RC flow by snooping previous ACKs associated with the RC flow. Continuous snooping of the ACKs may enable the process 800 to maintain accurate state for current MSN associated with the RC flow.

In numerous embodiments, the process 800 may maintain one or more states for the RC (block 830). For example, the one or more states may include at least one of the destination QP or the current MSN associated with the RC. In a number of embodiments, the process 800 may store in a memory or a database the information regarding the destination QP associated with the RC flow. In a variety of embodiments, the process 800 may maintain information regarding destination QPs of multiple RC flows. In still more embodiments, the process 800 may store in the memory or the database the information regarding the current MSN associated with the RC flow. In yet more embodiments, the process 800 may maintain information regarding current MSNs of multiple RC flows.

In various embodiments, the process 800 may generate a NACK for the RC QP (block 840). Upon identifying that the RC QP is associated with an incast congestion event, the process 800 may generate an RNR NACK for the RC QP. For example, the process 800 may utilize the one or more states to generate the RNR NACK. In additional embodiments, the process 800 may utilize the state information maintained for the destination QP to update a destination QP field in a NACK format to generate the RNR NACK. Further, the process 800 may utilize the state information maintained for the current MSN to update an MSN field in the NACK format to generate the RNR NACK. In some more embodiments, the process 800 may further utilize packet trimming and BTS capabilities to generate the RNR NACKs.

In further embodiments, the process 800 may transmit the NACK to a network device associated with the RC QP (block 850). Here, the network device is a sending endpoint network device associated with the RC QP. For example, the process 800 may transmit the generated RNR NACK to the RC QP when the RC QP is determined to contribute to an incast congestion event. As the RC QP receives the RNR NACK, an SQ of the RC QP may pause packet transmission. In many further embodiments, the SQ of the RC QP may pause packet transmission until an expiration of a pause time-period indicated in the RNR NACK. Since the RNR NACK only pauses transmission of the RC QP associated with the incast congestion event, other RC QPs of the sending endpoint device, that are not associated with the incast congestion event, continue data transmission to other receiving endpoint devices without interruption or pause.

Although a specific embodiment for incast congestion management suitable for carrying out the various steps, processes, methods, and operations described herein is discussed with respect to FIG. 8, any of a variety of systems and/or processes may be utilized in accordance with embodiments of the disclosure. For example, the process 800 implements the incast congestion management scheme without asserting a PFC upstream in the network. The elements depicted in FIG. 8 may also be interchangeable with other elements of FIGS. 1-7, 9, and 10 as required to realize a particularly desired embodiment.

Figure 9:
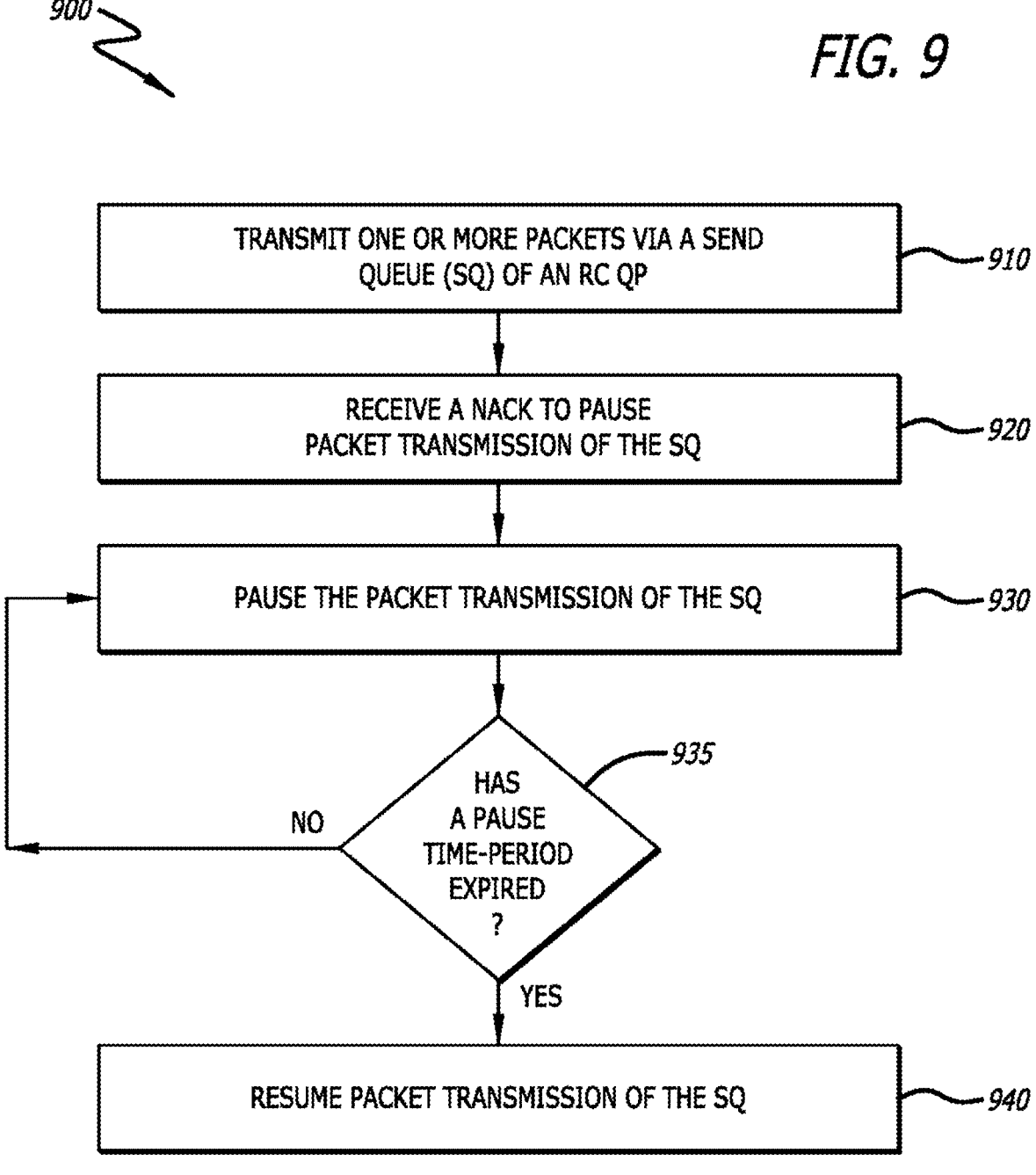
FIG. 9 is a flowchart showing a process for pausing packet transmission by a Reliable Connection (RC) Queue Pair (QP) for handing an incast congestion event in accordance with various embodiments of the disclosure.

Referring to FIG. 9, a flowchart showing a process 900 for pausing packet transmission by an RC QP for handing an incast congestion event in accordance with various embodiments of the disclosure is shown. In many embodiments, the process 900 may transmit one or more packets from an SQ of an RC QP (block 910). The RC QP may include the SQ and an RQ. The SQ may store outbound data for transmission to a receiving endpoint device and the RQ may store inbound data. One RC QP can be connected (e.g., send and receive messages) to exactly one other RC QP in a reliable way. In additional embodiments, packet transmission from the RC QP and many other RC QPs may result in an incast congestion event at a leaf switch connected to the receiving endpoint device.

In more embodiments, the process 900 may receive a NACK to pause packet transmission of the SQ (block 920). The process 900 may receive the NACK (e.g., an RNR NACK) based on the RC QP associated with the incast congestion at a network device (e.g., the leaf switch). A syndrome field in the NACK may indicate a pause time-period. For example, the syndrome field is usually 8 bits long and the information regarding the pause time-period may be indicated by the lower 5 bits of the syndrome field. The pause time-period may indicate a time interval for which the SQ is required to pause packet transmission.

In numerous embodiments, the process 900 may pause packet transmission of the SQ (block 930). For example, the process 900 may pause packet transmission of the SQ based on the NACK. Thus, during the pause time-period, the SQ of the RC QP does not transmit any packet to a receiving endpoint device. Pausing the packet transmission from the RC QP associated with the incast congestion event may instantly relieve the incast congestion.

In various embodiments, the process 900 may determine if the pause time-period has expired (block 935). For example, the RC QP may set a timer based on the pause time-period indicated in the NACK. Further, when the timer times out, the RC QP may establish expiration of the pause time-period. In some more embodiments, upon determining that the pause time-period has not expired, the process 900 may continue to wait (block 930).

However, when the pause time-period expires, the process 900 may resume packet transmission of the SQ (block 940). Thus, in response to the expiration of the pause time-period (or when the timer times out), the SQ of the RC QP may resume packet transmission from a packet having the PSN indicated in a PSN field of the received NACK. Such temporary pause of packet transmission from multiple RC QPs associated with the incast congestion event can enable recovery from the incast congestion event without asserting PFC upstream in the network.

Although a specific embodiment for pausing packet transmission by an RC QP for handing an incast congestion event suitable for carrying out the various steps, processes, methods, and operations described herein is discussed with respect to FIG. 9, any of a variety of systems and/or processes may be utilized in accordance with embodiments of the disclosure. For example, the timer upon timing out may generate a signal which can trigger the SQ to resume paused packet transmission. The elements depicted in FIG. 8 may also be interchangeable with other elements of FIGS. 1-8 and 10 as required to realize a particularly desired embodiment.

Figure 10:
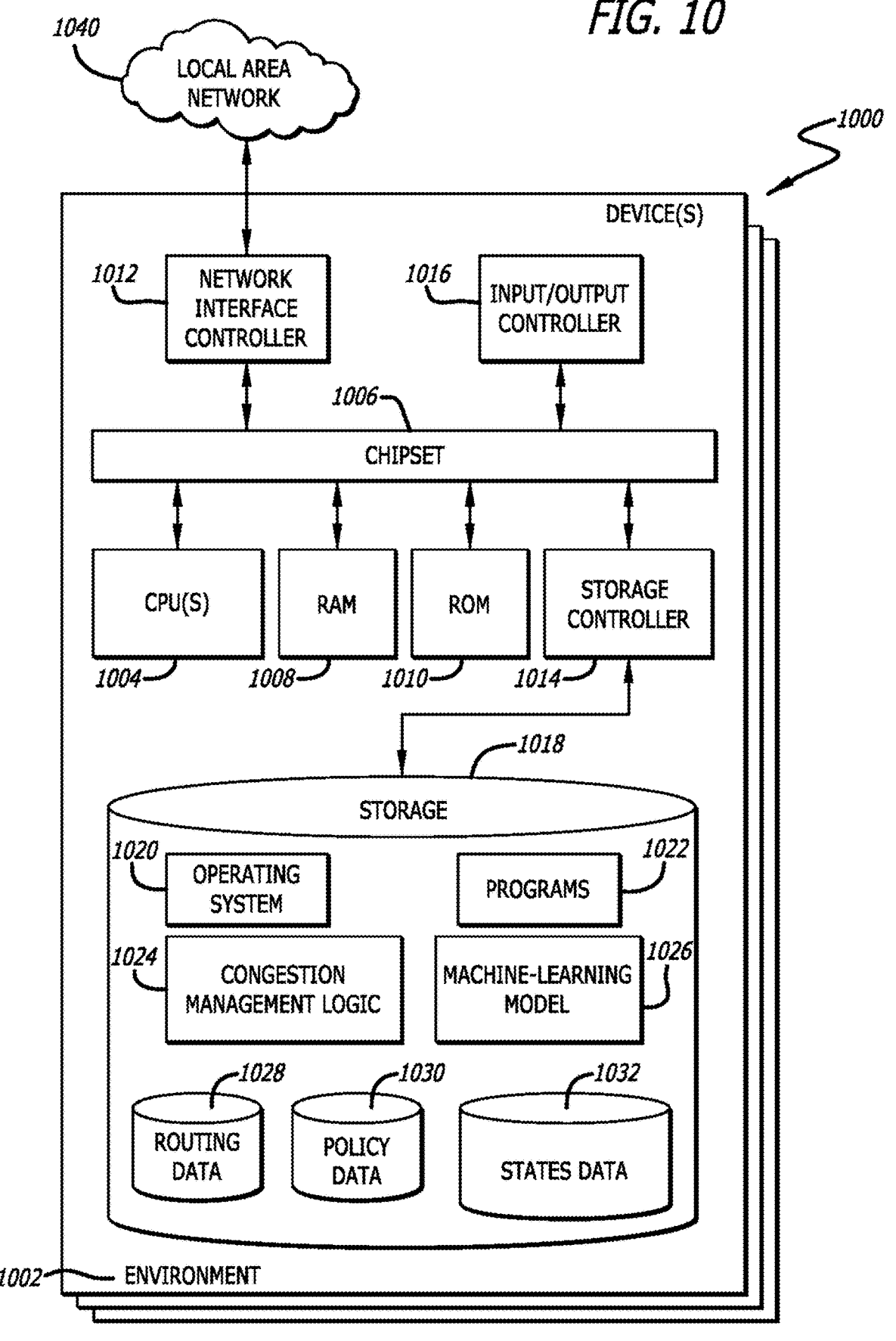
FIG. 10 is a conceptual block diagram for one or more devices capable of executing components and logic for implementing the functionality and embodiments described above.

Referring to FIG. 10, a conceptual block diagram for one or more devices 1000 capable of executing components and logic for implementing the functionality and embodiments described above is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the application and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations required for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in additional embodiments. The chipset 1006 can further be configured to provide an interface to a computer-readable storage medium such as a read-only memory ("ROM") 1010 or non-volatile RAM ("NVRAM") 1008 for storing basic routines that can help with various tasks such as, but not limited to, starting up the device 1000 and/or transferring information between the various components and devices. The ROM 1010 or NVRAM 1008 can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, and data 1028, 1030, 1032, which are described in greater detail below. The storage 1018 can be connected to the environment 1002 through a storage controller 1014 connected to the chipset 1006. In various embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In additional embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10, and can include other components that are not explicitly shown in FIG. 10, or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a congestion management logic 1024 that can be configured to perform one or more of the various steps, processes, operations, and/or other methods that are described above. Often, the congestion management logic 1024 can be a set of instructions stored within a non-volatile memory that, when executed by the processor(s)/controller(s) 1004 can carry out these steps, etc. In additional embodiments, the congestion management logic 1024 may be a client application that resides on a network-connected device, such as, but not limited to, a server, switch, personal or mobile computing device, an access point (AP). In various embodiments, the congestion management logic 1024 can utilize packet trimming and BTS capabilities at a leaf switch to quickly recover from an incast congestion event in a RoCEv2 enabled network without asserting PFC upstream in the network.

In several embodiments, the congestion management logic 1024 can enable the NIC 1012 of the device 1000 (for example, a switch) to detect if any of output ports is associated with an incast congestion event. In numerous embodiments, the congestion management logic 1024 can enable the NIC 1012 of the device 1000 (e.g., the switch) to directly notify one or more RC QPs, of various sending endpoint devices, associated with the incast congestion using RNR NACKs. The congestion management logic 1024 may generate the RNR NACKs by utilizing packet trimming and BTS capabilities described in the foregoing description of FIGS. 1-9. These RNR NACKs can be associated with staggered pause time-periods. Each RNR NACK may cause a SQ of the corresponding RC QP to pause and retry packet transmission, after the pause time-period ends. Thus, instantly relieving the incast congestion.

In numerous additional embodiments, the congestion management logic 1024 (when implemented at an endpoint device) may cause the NIC 1012 of the device 1000 to pause packet transmission from the SQ of the RC QP indicated by a received RNR NACK. The congestion management logic 1024 may further cause the RC QP to resume packet transmission from a PSN associated with the RNR NACKs. PSN in the RNR NACK may indicate that a packet with the PSN had an error and request packet retransmission after the indicated pause time-period.

In a number of embodiments, the storage 1018 can include routing data 1028. In additional embodiments, routing data 1028 can include information, for example, routing tables. Routing table may contain various entries that map destination IP addresses to next hop or outgoing ports. Routing tables enable the device 1000 in making packet forwarding decisions. MAC address table is an example of a routing table. MAC address table may include destination MAC addresses mapped to corresponding switch ports. The routing data 1028 may further store a mapping between IP addresses and MAC addresses within a network. Such mapping may be utilized to translate IP addresses to MAC addresses for proper forwarding of packets.

In various embodiments, the storage 1018 can include policy data 1030. In several embodiments, the policy data 1030 can comprise information regarding access control lists. Access control lists may delineate a sets of rules that determine what type of traffic is allowed or denied on the network. The set of rules can be based on various criteria such as source or destination IP addresses, port numbers, or communication protocols. In several more embodiments, the policy data 1030 can include QoS policies. For example, QoS policies can be used to prioritize certain types of traffic (e.g., RNR NACKs) over others to ensure that critical applications receive required latency requirements. In numerous additional embodiments, the policy data 1030 can further include security policies, authentication and authorization policies, or the like.

In still more embodiments, the storage 1018 can include states data 1032. States data 1032 may include current MSN and destination QP associated with various RC flows handled by the device 1000. States data 1032 can enable the device 1000 to generate RNR NACKs to pause those RC flows that are associated with an incast congestion event.

Finally, in many embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026. The ML model 1026 may be configured to learn traffic patterns associated with incast congestion events based on data related to historical incast congestion events. Such predictions may further improve the speed of the congestion management logic 1024 to trigger one or more actions to handle incast congestion events. Based on incast congestion event predictions of the ML models 1026, the congestion management logic 1024 can take pre-emptive actions to prevent occurrence of the incast congestion event. For example, instead of pausing all RC flows associated with the incast congestion event, the congestion management logic

1024 can transmit RNR NACKs to selective RC QPs. Thus, reducing processing stress on receiving end point device and preventing the occurrence of the incast congestion event.

The ML model(s) 1026 can be configured to generate inferences to make predictions or draw conclusions from data. An inference can be considered the output of a process of applying a model to new data. This can occur by learning from infrastructure data, sustainability data, and/or health data and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1026 may be generated by human/administrator verifications or may compare predicted outcomes with actual outcomes.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
    a processor;
    a network interface controller configured to provide access to a network; and
    a memory communicatively coupled to the processor, wherein the memory comprises a congestion management logic that is configured to:
        detect an incast congestion event;
        generate a negative acknowledgement for a Reliable Connection (RC) Queue Pair (QP) associated with the detected incast congestion event; and
        transmit the negative acknowledgement to a network device associated with the RC QP;
        wherein a send queue (SQ) of each identified RC QP is configured to pause packet transmission until expiration of a pause time-period indicated in a syndrome field of a corresponding receiver not ready negative acknowledgement (RNR NACK).

2. The device of claim 1, wherein the incast congestion event is detected based on an output buffer threshold of the device.

3. The device of claim 2, wherein the incast congestion event is detected based on a count of incoming packets exceeding the output buffer threshold of the device.

4. The device of claim 1, wherein the congestion management logic is further configured to:
    determine one or more packets that are to be dropped due to the detected incast congestion event; and
    drop the determined one or more packets.

5. The device of claim 1, wherein the negative acknowledgement corresponds to a receiver not ready negative acknowledgement and is configured to indicate a packet sequence number of a first-to-be-dropped packet associated with the RC QP.

6. The device of claim 5, wherein the negative acknowledgement is further configured to indicate a pause time-period.

7. The device of claim 6, wherein the congestion management logic is further configured to determine the pause time-period based on a round trip time associated with the network.

8. The device of claim 1, wherein the negative acknowledgement for the RC QP and another negative acknowledgement for another RC QP have unique pause time-periods.

9. The device of claim 1, wherein generating the negative acknowledgement for the RC QP comprises:
    trimming a payload of a first-to-be-dropped packet associated with the RC QP;
    swapping source information and destination information in the first-to-be-dropped packet;
    converting the first-to-be-dropped packet to a negative acknowledgement format, wherein the negative acknowledgement format includes a syndrome field; and
    updating the syndrome field in the negative acknowledgement format to include a pause time-period for the RC QP.

10. The device of claim 1, wherein to generate the negative acknowledgement, the congestion management logic is further configured to maintain one or more states for an RC associated with the RC QP.

11. The device of claim 10, wherein the one or more states include at least one of a destination QP or a current message sequence number associated with the RC.

12. The device of claim 11, wherein to maintain the destination QP, the congestion management logic is further configured to snoop one or more incoming packets associated with the RC.

13. The device of claim 11, wherein to maintain the current message sequence number, the congestion management logic is further configured to snoop one or more acknowledgements associated with the RC.

14. A device, comprising:

a processor;

a network interface controller configured to provide access to a network; and a memory communicatively coupled to the processor, wherein the memory comprises:

a Reliable Connection (RC) Queue Pair (QP) comprising a Send Queue (SQ); and a congestion management logic that is configured to:

transmit one or more packets via the SQ;

receive a negative acknowledgement to pause packet transmission of the SQ based on the RC QP associated with an incast congestion at a network device; and pause the packet transmission of the SQ based on the negative acknowledgement;

wherein the SQ of each identified RC QP is configured to pause packet transmission until expiration of a pause time-period indicated in a syndrome field of a corresponding receiver not ready negative acknowledgement (RNR NACK).

15. The device of claim 14, wherein the negative acknowledgement is configured to indicate at least one of a pause time-period and a packet sequence number.

16. The device of claim 15, wherein the packet transmission is paused for the pause time-period.

17. The device of claim 15, wherein the congestion management logic is further configured to resume the packet transmission based on expiration of the pause time-period.

18. The device of claim 15, wherein the congestion management logic is further configured to resume the packet transmission of the SQ from a packet having the packet sequence number indicated by the negative acknowledgement.

19. A method, comprising:

detecting an incast congestion event;

generating a negative acknowledgement for a Reliable Connection (RC) Queue Pair (QP) associated with the detected incast congestion event; and transmit the negative acknowledgement to a network device associated with the RC QP;

wherein a send queue (SQ) of each identified RC QP is configured to pause packet transmission until expiration of a pause time-period indicated in a syndrome field of a corresponding receiver not ready negative acknowledgement (RNR NACK).

\*   \*   \*   \*   \*